(12) United States Patent
Nakamura et al.

(10) Patent No.: US 9,041,805 B2
(45) Date of Patent: May 26, 2015

(54) VIBRATION APPLYING STRUCTURE DETECTING DEVICE AND VEHICLE CONTROL DEVICE

(75) Inventors: Masahide Nakamura, Yokohama (JP); Kouki Minegishi, Atsugi (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 789 days.

(21) Appl. No.: 13/204,857

(22) Filed: Aug. 8, 2011

(65) Prior Publication Data

US 2012/0033076 A1 Feb. 9, 2012

(30) Foreign Application Priority Data

Aug. 9, 2010 (JP) ................................. 2010-178931

(51) Int. Cl.
| | | |
|---|---|---|
| H04N 9/47 | (2006.01) | |
| H04N 7/18 | (2006.01) | |
| B60W 30/12 | (2006.01) | |
| B60W 10/06 | (2006.01) | |
| B60W 10/18 | (2012.01) | |
| B60K 26/02 | (2006.01) | |

(52) U.S. Cl.
CPC .............. *B60W 30/12* (2013.01); *B60K 26/021* (2013.01); *B60W 10/06* (2013.01); *B60W 10/18* (2013.01); *B60W 2520/28* (2013.01); *B60W 2720/14* (2013.01)

(58) Field of Classification Search
CPC .... B60R 1/00; B60R 2300/105; B60R 11/04; B60R 2300/802; B60R 2300/804; B60R 2021/01302; H04N 7/181; B60T 7/22; B60T 2201/08
USPC .......................................... 348/113–119, 148
See application file for complete search history.

(56) References Cited

U.S. PATENT DOCUMENTS

| | | | |
|---|---|---|---|
| 6,014,595 A * | 1/2000 | Kobayashi ........................ 701/1 |
| 7,109,850 B2 | 9/2006 | Kawazoe et al. | |
| 7,477,978 B2 | 1/2009 | Kawazoe et al. | |
| 7,660,669 B2 | 2/2010 | Tsuda | |
| 2004/0183663 A1* | 9/2004 | Shimakage .................... 340/436 |
| 2005/0236210 A1* | 10/2005 | Kawazoe et al. ............. 180/272 |
| 2008/0243337 A1* | 10/2008 | Tsuda ............................. 701/41 |

FOREIGN PATENT DOCUMENTS

| | | |
|---|---|---|
| JP | 2001-341599 | 12/2001 |
| JP | 2007-90956 | 4/2007 |

\* cited by examiner

*Primary Examiner* — Andy Rao
*Assistant Examiner* — Jared Walker
(74) *Attorney, Agent, or Firm* — Drinker Biddle & Reath LLP

(57) ABSTRACT

A vibration applying structure detecting device for a wheeled vehicle traveling on a roadway having a vibration applying structure on a road surface in or adjacent to the roadway includes a lane departure judgment device that determines whether there is a lane departure tendency, a vibration detecting device that determines the frequency and the amplitude of input vibration from a road surface to the vehicle, and a contact judgment device that determines that at least one of the wheels of the vehicle is contacting the vibration applying structure when the input vibration with an amplitude equal to or greater than a prescribed amplitude threshold value has a frequency that is equal to or greater than a prescribed frequency threshold value. The device may also include a threshold value setting device that sets one or both of the amplitude threshold value and the frequency threshold value.

24 Claims, 18 Drawing Sheets

VIBRATION APPLYING STRUCTURE DETECTING DEVICE AND VEHICLE CONTROL DEVICE

CROSS-REFERENCE TO RELATED APPLICATIONS

This application claims priority under 35 U.S.C. §119 to Japanese Patent Application No. 2010-178931, filed on Aug. 9, 2010, which is incorporated by reference herein in its entirety.

BACKGROUND OF THE INVENTION

1. Field of Invention

The present invention relates to a vibration applying structure detecting device, which can detect a vibration applying structure formed on a roadway, and a vehicle control device equipped with such a vibration applying structure detecting device.

2. Description of Related Art

Conventionally, technology is known as a technology for detecting when vehicle wheels contact rumble strips as a vibration applying structure. The rumble strips are bumps and dips provided on the road surface along the travel lane at the edge of the travel lane. The amplitude and frequency of the vibration input into the vehicle are detected. Based on that amplitude and frequency of vibration, when it is determined that the wheels of that vehicle are contacting rumble strips, that information is reported to the driver.

However, vibration caused by bumps and dips on a road surface other than rumble strips is also input into a travelling vehicle. As a result, the vibration caused by bumps and dips other than rumble strips may be erroneously detected as vibration caused by rumble strips.

SUMMARY OF THE INVENTION

An objective of the present invention is to solve the aforementioned problem by providing a vibration applying structure detecting device and a vehicle control device that can accurately detect when the vehicle wheels are contacting a vibration applying structure.

According to the present invention, the vibration input from the road surface into a vehicle is detected. For input vibration having an amplitude that is equal to or greater than a prescribed amplitude threshold value, if the frequency of vibration is equal to or greater than a prescribed frequency threshold value, then at least one of the wheels of the vehicle is determined to be contacting rumble strips.

In one embodiment, a vibration applying structure detecting device is described for a wheeled vehicle traveling on a roadway having a vibration applying structure on a road surface in or adjacent to the roadway. The vibration applying structure detecting device includes a lane departure judgment device that determines whether there is a lane departure tendency, a vibration detecting device that determines the frequency and the amplitude of input vibration from a road surface to the vehicle, and a contact judgment device that determines that at least one of the wheels of the vehicle is contacting the vibration applying structure when the input vibration with an amplitude equal to or greater than a prescribed amplitude threshold value has a frequency that is equal to or greater than a prescribed frequency threshold value. The vibration applying structure detecting device may also include a threshold value setting device that sets one or both of the amplitude threshold value and the frequency threshold value, wherein when it is judged by the lane departure tendency judgment device that there is a lane departure tendency, the threshold value setting device sets one or both of the frequency threshold value and the amplitude threshold value to a value smaller than that when it is judged that there is no lane departure tendency.

In another embodiment, a vehicle control device is described for a for a wheeled vehicle traveling on a roadway having a vibration applying structure on a road surface in or adjacent to the roadway. The vehicle control device includes a vibration applying structure detecting device having a lane departure judgment device that determines whether there is a lane departure tendency, a vibration detecting device that determines the frequency and amplitude of input vibration from a road surface to the vehicle, a contact judgment device that determines that the wheels of the vehicle are contacting a vibration applying structure located on or adjacent to the roadway on which the vehicle is traveling, when the input vibration with an amplitude equal to or greater than a prescribed amplitude threshold value has a frequency that is equal to or greater than a prescribed frequency. The vehicle control device further includes a yaw moment application device that applies a yaw moment to the vehicle to prevent the vehicle from departing from the roadway when it is determined that the wheels of the vehicle are contacting the vibration applying structure. The vehicle control device may also include the vibration applying structure having a threshold value setting device that sets one or both of the frequency threshold value and amplitude threshold value to a value smaller when it is judged that there is a lane departure tendency than that when it is judged that there is no lane departure tendency.

In another embodiment of a vehicle control device, when there is a lane departure tendency the lane departure judgment device detect the departure direction of the lane departure, the vibration detecting device detects the input vibration to each of the wheels of the vehicle, and the contact judgment device determines whether each of the wheels is contacting the vibration applying structure by determining whether the input vibration with an amplitude equal to or greater than a prescribed amplitude threshold value has a frequency that is equal to or greater than a prescribed frequency with respect to each input vibration from each of the wheels, and the yaw moment applying device applies a yaw moment to the vehicle to prevent the vehicle from departing from the roadway when it is judged that the wheels in the departure direction of the vehicle are contacting the vibration applying structure. The vehicle control device may also include a deceleration device that applies deceleration to the vehicle when it is detected that the wheels opposite the departure direction are contacting the vibration applying structure within a prescribed period of time after it is detected that the wheels in the departure direction of the vehicle are contacting the vibration applying structure.

In another embodiment, a vibration applying structure detecting device is described for a wheeled vehicle traveling on a roadway having a vibration applying structure on a road surface in or adjacent to the roadway. The vibration applying structure detecting device includes a lane departure judgment means for determining whether there is a lane departure tendency, a vibration detecting means for determining the frequency and amplitude of input vibration from a road surface to the vehicle, a contact judgment means for determining that at least one of the wheels of the vehicle is contacting the vibration applying structure when the input vibration with an amplitude equal to or greater than a prescribed amplitude threshold value has a frequency that is equal to or greater than a prescribed frequency threshold value, and a threshold value setting means used to set one or both of the amplitude threshold value and the frequency threshold value, wherein when it is judged by the lane departure tendency judgment that there is a lane departure tendency, the threshold value setting means sets the frequency threshold value and/or the amplitude threshold value to a value smaller than that when it is judged that there is no lane departure tendency.

In another embodiment, a method is described for determining that a wheeled vehicle has the possibility of departing a travel lane of a roadway having a vibration applying structure on a road surface in or adjacent to the roadway. The method includes determining whether there is a lane departure tendency of the vehicle, determining the frequency and amplitude of input vibration from the road surface to the vehicle, determining that at least one of the wheels of the vehicle is contacting the vibration applying structure, when the input vibration with an amplitude equal to or greater than a prescribed amplitude threshold value has a frequency that is equal to or greater than a prescribed frequency threshold value, and setting means for setting one or both of the amplitude threshold value and the frequency threshold value. The method further includes, when it is judged by the lane departure tendency judgment that there is a lane departure tendency, setting the frequency threshold value and/or the amplitude threshold value to a value smaller than that when it is judged that there is no lane departure tendency.

According to the present invention, since the frequency threshold value and/or amplitude threshold value used for judging that the wheels of the vehicle are contacting rumble strips are set such that the values are smaller in the case when it is judged that there is a lane departure tendency than in the case when it is judged that there is no lane departure tendency, when a lane departure tendency occurs, the frequency threshold value or the amplitude threshold value can be set at a larger value to prevent erroneously detecting vibration caused by bumps and dips other than rumble strips as vibration caused by rumble strips. Thus, when there is a lane departure tendency, it is possible to accurately detect the fact that the vehicle is contacting a vibration applying structure such as rumble strips.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

In the following, embodiments of the present invention will be explained with reference to figures.

Overall Configuration of the Vehicle Control Device.

Figure 1:
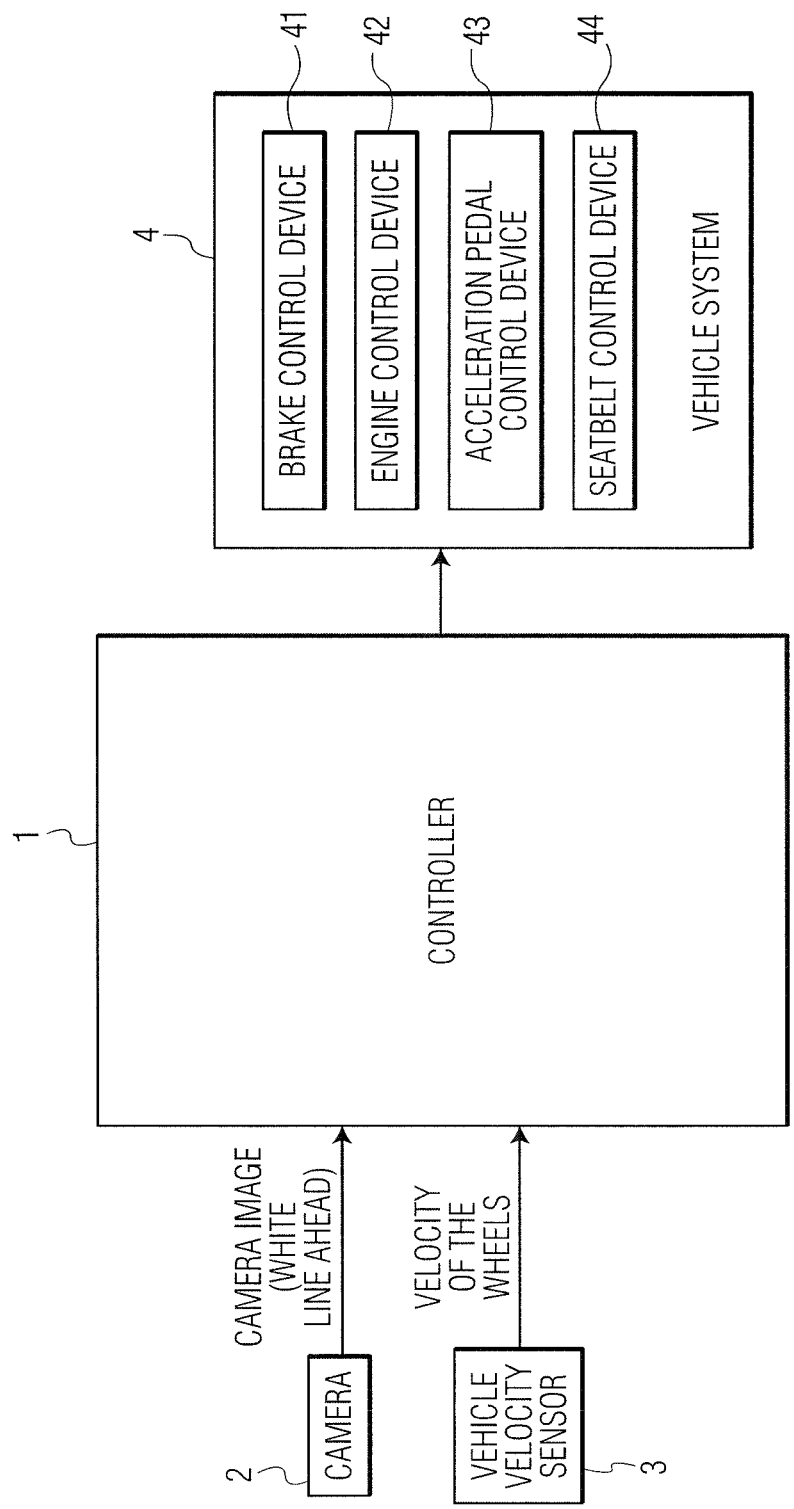
FIG. 1 is a block diagram illustrating the configuration of a vehicle control device to which the present invention is applied.

An embodiment of a vehicle control device has a configuration as shown in FIG. 1. The vehicle control device is provided on a vehicle to detect the edge of a lane on a road where a vehicle is traveling (travel lane) or on a road boundary (the boundary between the travel lane and the road shoulder) by determining whether one or more of the tires of the vehicle are contacting a vibration applying structure, such as rumble strips, that apply vibration to the vehicle when the tires of the vehicle run over the rumble strips. In this way, the vehicle control device can detect instances in which the vehicle may depart from the road and thus prevent the vehicle from departing from the road.

Rumble strips are bumps and dips formed by steps or cavities on a road surface and are provided along the extending direction of the travel lane. Consequently, when the tires of a vehicle run over or contact the rumble strips, noises and/or vibration occur to the vehicle. In this way, the attention of the driver of the vehicle can be aroused when the vehicle is departing from the road.

The vehicle control device has a camera 2, a wheel velocity sensor 3, and a vehicle system 4 connected to a controller 1.

The camera 2 is an external recognition sensor used for detecting the position of the vehicle within the traveling lane (also referred to as vehicle lane or travel lane) by picking up an image of the position in front of the vehicle. The camera 2 is, for example, disposed in the front of the vehicle, and the lane dividing line that is several meters ahead is used as the image pickup range. The camera 2 outputs the camera image to the controller 1 at a prescribed timing.

The controller 1 detects the lane dividing line from the camera image picked up by the camera 2 and detects the yaw angle $\Phi$ within the travel lane, the transverse displacement X, the curvature $\beta$ of the travel lane, and the lane type L_class based on the detected lane dividing line. The transverse displacement X represents the distance from the center of the lane in the width direction of the lane to the vehicle. The yaw angle $\Phi$ represents the angle formed between the lane extending direction and the travel direction of the vehicle. The lane type L_class indicates whether the lane dividing line is a lane dividing line at the edge of the roadway (e.g., a solid lane dividing line) or a lane dividing line within the roadway (e.g., a broken lane dividing line). Since methods for detecting the yaw angle $\Phi$, the transverse displacement X, the curvature $\beta$, and the lane type L_class based on the lane dividing line detected from the camera image picked up by the camera 2 is known, they will not be described in detail. For example, the picked up image can be converted into a top-view image. The yaw angle $\Phi$ can be detected from the angle of the lane dividing line with respect to up/down direction of the image on the top-view image. The transverse displacement X can be detected from the position of the lane dividing line in the left/right direction on the top-view image. The curvature $\beta$ of the vehicle lane can be detected from the curvature of the lane dividing line on the top-view image. The type L_class of the lane dividing line can be detected from the shape of the lane dividing line on the top-view image.

The wheel velocity sensor 3 is used to measure the velocity of the wheels of the vehicle. A wheel velocity sensor 3 is provided with respect to each of the four wheels of the vehicle. The wheel velocity sensor 3 outputs a wheel velocity signal to the controller 1. In this way, the controller 1 can detect the velocity of each wheel of the vehicle and derive the traveling velocity of the vehicle.

The vehicle system 4 includes a brake control device 41, an engine control device 42, an acceleration pedal control device 43, and a seatbelt control device 44. The control devices 41, 42, 43, and 44 in the vehicle system 4 perform control for preventing road departure of the vehicle (road departure prevention control) corresponding to the control signals sent from the controller 1.

The controller 1 may include a ROM, RAM, CPU, and other conventional components of such a controller. The controller 1 has functions that can be realized when the CPU carries out processing in accordance with a road departure prevention program stored in the ROM.

The controller 1 determines whether there is a lane departure tendency, that is, the possibility that the vehicle will depart from the travel lane, and detects the vibration input to the wheels of the vehicle from the road surface. First, the controller detects vibration with an amplitude equal to or bigger than a prescribed amplitude threshold value among the detected vibrations, and then determines whether the frequency of that vibration is equal to or higher than a predetermined prescribed frequency threshold value. If so, the controller 1 judges that the wheels of the vehicle are contacting rumble strips. The controller 1 sets the frequency threshold value to a smaller value when it judges that there is a lane departure tendency compared with the value set when it is judged that there is no lane departure tendency. As used herein, lane departure means that the vehicle departs from the traveling lane (for example, departing to a lane in the opposite direction, an adjacent lane, or the road shoulder), while roadway departure means that the vehicle departs from the roadway used for traveling (for example, departing from the roadway to the road shoulder as in FIG. 3).

The controller 1 adjusts the frequency threshold value so that the vehicle can accurately detect rumble strips. First, the controller 1 sets an original prescribed frequency threshold value. Then, the controller 1 determines whether the vehicle has a possibility of departing from the travel lane (a lane departure tendency) based on the transverse position X, the yaw angle $\Phi$, the curvature $\beta$ of the travel lane, and the wheel velocity. The controller 1 uses a lane departure judgment flag indicating whether the vehicle has a possibility of departing from the lane and the lane type L_class to determine whether there is a possibility that the vehicle will depart from the roadway (a roadway departure tendency). The controller 1 changes the frequency threshold value when it finds that the vehicle has a roadway departure tendency.

There may be conditions under which the controller 1 is unable to detecting the yaw angle $\Phi$ within the travel lane, the transverse displacement X, the curvature $\beta$ of the travel lane, and the lane type L_class based on the detected lane dividing line, for example when there is a malfunction of the camera 2, heavy snow on the roadway, or reflecting sunlight on the roadway. Under such conditions, the controller 1 will determine that there is no lane departure tendency or roadway departure tendency. As a result, neither the lane departure flag nor the roadway departure flag will be set, and the frequency threshold value will be maintained at the original value.

When the lane departure judgment flag is set, since it has been detected that the vehicle has a lane departure tendency, if the lane type L_class in the departure direction is a solid line, the controller 1 determines that there is a roadway departure tendency and reduces the frequency threshold value with respect to the wheels in that departure direction. The wheels in the departure direction are the wheels on the side of the direction where a departure tendency occurs among the left and right wheels. At that time, the controller 1 does not change the frequency threshold value with respect to the wheels on the side opposite the departure direction (the wheels on the side opposite the direction where a departure tendency occurs among the left/right wheels).

Subsequently, when it is detected that the wheels in the departure direction are contacting rumble strips, the controller 1 returns the frequency threshold value with respect to the wheels in the departure direction to the original value. Then, controller 1 reduces the frequency threshold value with respect to the wheels on the side opposite side the departure direction. Subsequently, when contact of the wheels on the side opposite the departure direction with rumble strips is detected, the controller 1 returns the frequency threshold value with respect to the wheels on the side opposite the departure direction to the original value.

Regardless whether the frequency threshold value remains at its original value or is reduced to a lower value based on detection of a lane departure tendency, when the controller 1 detects that any of the wheels of the vehicle is contacting the rumble strips, it performs road departure prevention control to control the behavior of the vehicle to avoid departure from the road. More specifically, the controller 1 generates a yaw moment in the vehicle to return the vehicle back into the travel lane or generates a deceleration to lower the velocity. At that time, the controller 1 calculates a control command value used for performing road departure prevention control that controls the behavior of the vehicle to prevent the vehicle from departing from the road and outputs that value to the vehicle system 4. In this way, when the wheels of the vehicle run over the rumble strips, the controller 1 notifies the driver that the vehicle may depart from the road and performs road departure prevention control that controls the driving power of the vehicle to prevent the vehicle from departing from the road.

Figure 2:
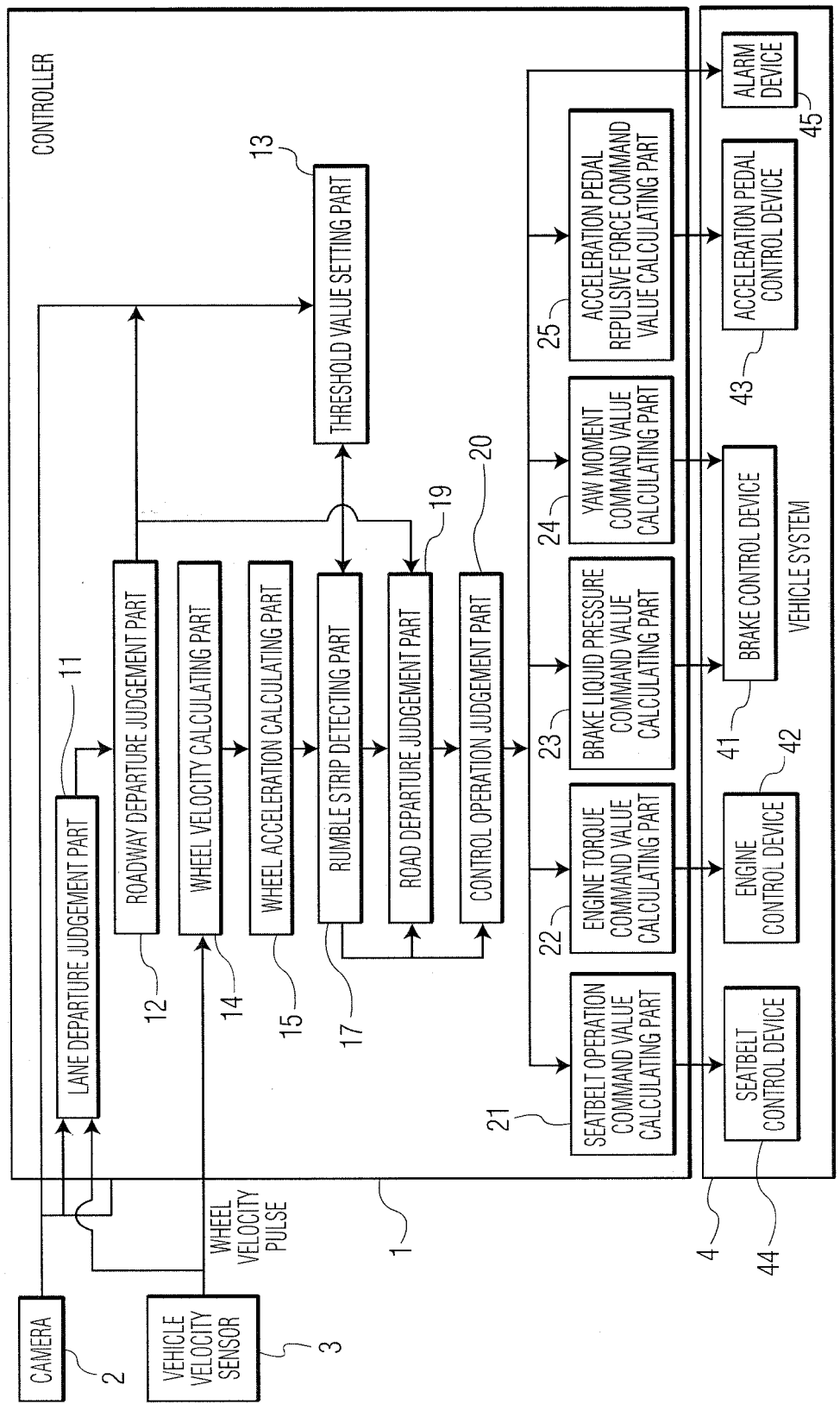
FIG. 2 is a block diagram illustrating the functional configuration of the controller in a vehicle control device disclosed in the present invention.

The functional configuration and operation of the controller 1 in the vehicle control device will be explained with reference to FIG. 2.

The controller 1 has a lane departure judgment part 11 connected to the camera 2, a roadway departure judgment part 12, and a threshold value setting part 13. The controller 1 also has a wheel velocity calculating part 14 connected to the wheel velocity sensor 3, a wheel acceleration calculating part 15, and a square wave generating part 16. In addition, the controller 1 has a rumble strip detecting part 17, a road departure judgment part 19, and a control operation judgment part 20. Moreover, the controller 1 has a seatbelt operation command value calculating part 21 connected to the vehicle system 4, an engine torque command value calculating part 22, a brake fluid pressure command value calculating part 23, a yaw moment command value calculating part 24, and an acceleration pedal repulsive force command value calculating part 25.

The lane departure judgment part 11 judges lane departure, that is, whether the vehicle has a possibility of departing from the travel lane (whether a lane departure tendency occurs) based on the yaw angle $\Phi$ of the vehicle within the travel lane, the transverse displacement X from the lane center, the curvature $\beta$ of the travel lane, and the vehicle velocity derived using the camera image provided from the camera 2. The method for judging the lane departure will be described below. When the lane departure judgment part 11 finds that there is a lane departure tendency for the vehicle to depart from the travel lane, it sets a lane departure judgment flag. The lane departure judgment flag is generated for each right-side departure or left-side departure corresponding to the departure direction as to whether the vehicle departs to the left or right with respect to the travel lane. The lane departure judgment flag is provided to the roadway departure judgment part 12.

The roadway departure judgment part 12 determines whether roadway departure occurs, that is, whether the vehicle departs from the roadway (whether there is a roadway departure tendency) based on the lane departure judgment flag provided from the lane departure judgment part 11 and the lane type L_class derived using the camera image supplied from the camera 2. More specifically, when the lane departure flag is set and the lane dividing line on the side of the departure direction judged based on the lane type L_class is a solid line, it means that a roadway departure tendency occurs. In this embodiment, the lane type L_class consists of two kinds, a solid lane dividing line and a broken lane dividing line. This, however, is not the only choice. For example, the lane type L_class may consist of three kinds, a solid lane dividing line, a broken lane dividing line, and a double lane dividing line. If the lane dividing line on the side of the departure direction is a solid line or a double line, it means that a roadway departure tendency occurs. In other words, it is checked whether the lane type L_class is the lane dividing line at the edge of the roadway. It is also possible to store the shape of the lane dividing line at the edge of the roadway and the shape of the lane dividing line within the roadway corresponding to map information for navigation, compare the stored information with the shape of the lane dividing line in the picked up image, and determine whether the lane dividing line is a lane dividing line at the edge of the roadway.

When the vehicle departs from the roadway, the controller 1 sets a roadway departure flag. The roadway departure flag is provided along with the lane departure judgment flag provided from the lane departure judgment part 11 to the threshold value setting part 13 and the road departure judgment part 19. The roadway departure flag indicates whether the vehicle has a possibility of departing from the roadway. It also indicates whether the area outside the travel lane is the roadway when the vehicle departs from the travel lane. That is, since both travel lane departure and roadway departure are departures from the travel lane and the difference is whether the vehicle departs out of the roadway, roadway departure can be deemed as one form of lane departure of the vehicle departing from the lane.

The lane departure judgment part 11 determines whether the lane dividing line in the departure direction is a solid line based on the lane type L_class of the lane dividing line. If the detected lane dividing line is a solid line, it is also possible to detect the distance between the solid lane dividing line and the transverse displacement from the lane center (either the current transverse displacement X or the transverse displacement after a prescribed period of time). In this way, the frequency threshold value is changed, as described later, only when the possibility is high that the vehicle will depart from the solid lane dividing line (that is, depart from the roadway) and reach the rumble strips.

The threshold value setting part 13 sets the frequency threshold value based on the roadway departure flag (lane departure tendency) supplied from the roadway departure judgment part 12, the transverse displacement X from the lane center derived using the camera image provided from the camera 2, the road type, and the departure direction. The frequency threshold value is provided to the rumble strip detecting part 17. The frequency threshold value in the threshold value setting part 13 will be described later.

The wheel velocity calculating part 14 calculates the wheel velocity of the right front wheel, the left front wheel, the right rear wheel, and the left rear wheel based on wheel velocity pulses provided from the wheel velocity sensor 3. The velocity of each wheel is provided to the wheel acceleration calculating part 15.

The wheel acceleration calculating part 15, for example, differentiates the velocity of each wheel to calculate the acceleration of each wheel based on the velocity of each wheel provided from the wheel velocity calculating part 14. The acceleration of each wheel is provided to the rumble strip detecting part 17.

Figure 23:
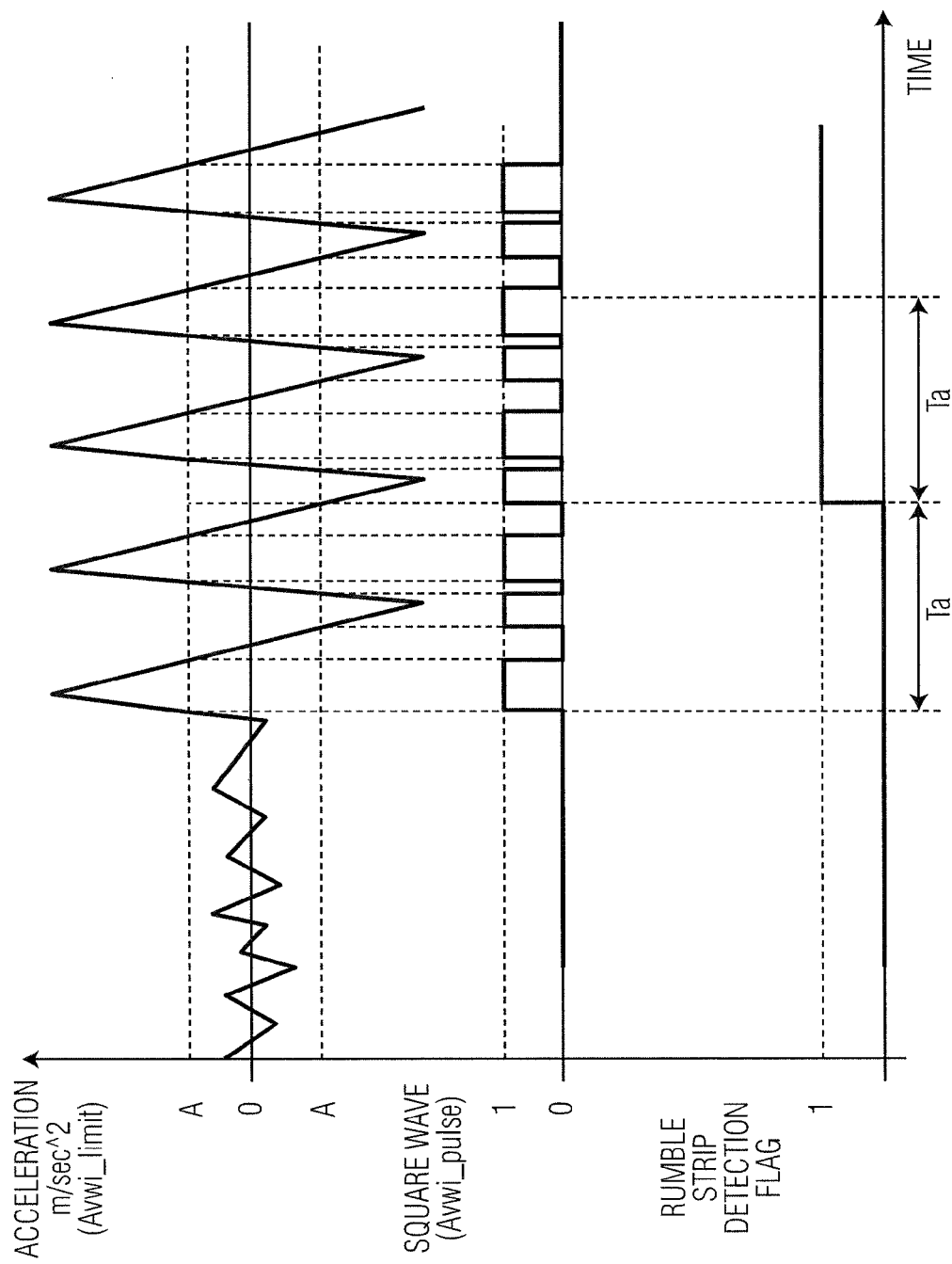
FIG. 23 is a timing chart illustrating the relationship between the acceleration, square wave signal, and rumble strip detection flag in the in a vehicle control device disclosed in the present invention.

The rumble strip detecting part 17 first generates a square wave signal of each wheel by comparing the absolute value of the acceleration of each wheel calculated by the wheel acceleration calculating part 15 with predetermined amplitude threshold value A. More specifically, as shown in FIG. 23, a signal of 1 is output if the absolute value of the wheel acceleration is equal to or bigger than the predetermined threshold value A, and a signal of 0 is output if the absolute value of the wheel acceleration is smaller than the predetermined amplitude threshold value A, thereby generating a square wave signal. The acceleration that occurs on the wheel when the wheels contact the rumble strips is derived experimentally beforehand, and the amplitude threshold value A is set based on the experimentally derived acceleration.

As described above, the controller 1 derives the wheel acceleration from the velocity of each wheel and generates a square-wave signal based on the absolute value of the acceleration of each wheel and amplitude threshold value A. Consequently, the influence of small bumps and dips on, for example, an asphalt surface or other road surface can be eliminated, and the square-wave signal is generated based on the wheel acceleration with a certain magnitude or higher that occurs when the wheels run over the rumble strips (acceleration with amplitude equal to or bigger than amplitude threshold value A).

The rumble strip detecting part 17 checks whether each wheel contacts the rumble strips based on the roadway departure flag obtained from the roadway departure judgment part 12 and whether the frequency of the square-wave signal of each wheel exceeds the frequency threshold value obtained from the threshold value setting part 13. More specifically, as shown in FIG. 23, if the number of square-wave signals in a predetermined prescribed period of time Ta (for example, 30 msec) is equal to or more than a threshold number set by the threshold value setting part 13, that is, if the frequency of the square-wave signals is equal to or higher than a prescribed frequency, it means that the wheels are contacting the rumble strips. Consequently, the frequency threshold value set by the threshold value setting part 13 becomes a value indicating the number of square waves. If contact with the rumble strips is detected, the rumble strip detecting part 17 supplies the rumble strip detection flag of the wheel concerned (a flag including information indicating which wheel is contacting the rumble strips) to the road departure judgment part 19. In this case, the frequency threshold value set by the threshold value setting part 13, that is, the number of square waves, can also be set corresponding to the vehicle velocity so that it decreases as the vehicle velocity increases.

It is also possible for the vehicle control device to have a vertical G (vertical acceleration) sensor provided on each wheel in order to judge the contact between each wheel and the rumble strips to determine contact with the rumble strips in the same way as described above. In this case, the controller 1 determines whether the vibration frequency of the vertical vibration of the wheels indicates contact between each wheel and the rumble strips based on the vertical acceleration of the wheels detected by the vertical G sensor. Since the rumble strips are formed by steps or cavities provided at a predetermined prescribed spacing, the magnitude of the vertical acceleration input to each wheel when the wheels are contacting the rumble strips is derived experimentally beforehand, and amplitude threshold value A is set. A square-wave signal comprising amplitude threshold value A and the acceleration of the wheels detected by the vertical G sensor is generated. If the frequency of the square-wave signal exceeds a prescribed frequency threshold value, it means that the wheels of the vehicle are contacting the rumble strips.

The road departure judgment part 19 checks if there is a high possibility that the vehicle will depart from the road based on the rumble strip detection flag of each wheel provided from the rumble strip detecting part 17 and the lane departure judgment flag provided from the roadway departure judgment part 12. FIG. 5 is used to show the processing content of the road departure judgment part 19 in detail. The following processing is started when it is detected that any wheel is contacting the rumble strips (when it is detected that any wheel is contacting the rumble strips in step S6 in FIG. 4, to be described later).

In step S21, it is checked whether a tendency for departure from the roadway is occurring to the vehicle based on the roadway departure flag provided from the roadway departure judgment part 12. If the roadway departure flag indicates that there is a tendency for departure from the roadway, the process advances to step S22. Otherwise, whether there is tendency for departure from the roadway is again checked.

In step S22, it is checked whether the wheels in the departure direction are contacting the rumble strips (and whether the wheels contacting the rumble strips are the wheels in the departure direction) based on the lane departure flag provided from the roadway departure judgment part 12 and the rumble strip detection flag provided from the rumble strip detecting part 17. That is, if wheels contacting the rumble strips are the right-side wheels of the vehicle as indicated by the rumble strip detection flag provided from the rumble strip detecting part 17 and the lane departure direction indicated by the lane departure flag is the right direction, it means that the wheels in the departure direction are contacting the rumble strips. Similar, if the wheels contacting the rumble strips are the left-side wheels and the lane departure direction indicated by the lane departure flag is the left direction, it means that the wheels in the departure direction are contacting the rumble strips. If it is found that the wheels in the departure direction are contacting the rumble strips, the process advances to S23. Otherwise, whether there is tendency for departure from the roadway is again checked.

In step S23, time counting is started by a counter, and then the process advances to step S24.

In step S24, it is checked whether the wheels on the side opposite the departure direction are contacting the rumble strips based on the rumble strip detection flag provided from the rumble strip detecting part 17 and the lane departure flag provided from the roadway departure judgment part 12. That is, if wheels contacting the rumble strips are the right-side wheels of the vehicle as indicated by the rumble strip detection flag provided from the rumble strip detecting part 17 and the lane departure direction indicated by the lane departure flag is the left direction, it means that the wheels on the side opposite the departure direction are contacting the rumble strips. Similarly, if the wheels contacting the rumble strips are the left-side wheels and the lane departure direction indicated by the lane departure flag is the right direction, it means that the wheels on the side opposite the departure direction are contacting the rumble strips. If it is found that the wheels on the side opposite the departure direction are contacting the rumble strips, the process advances to S25.

If it is found in step S22 that the wheels in the departure direction are contacting the rumble strips and it is found in step S24 that the wheels on the side opposite the departure direction are contacting the rumble strips, it means that the wheels on the side opposite the departure direction are contacting the rumble strips after the wheels in the departure direction have contacted the rumble strips as the vehicle is departing from the roadway. Therefore, there is a high possibility for road departure to occur. In other words, a tendency for road departure occurs at the time point when the wheels in the departure direction are contacting the rumble strips. If the wheels on the side opposite the departure direction subsequently contact the rumble strips, there is a high possibility that road departure will occur. In step S25, the road departure flag indicating that there is a high possibility that road departure will occur is set and output to the control operation judgment part 20.

On the other hand, if it is found in step S24 that the wheels on the side opposite the departure direction are not contacting the rumble strips, it is checked in step S26 whether the time counted by the timer has reached a prescribed period of time (for example, 20 sec) or longer. If the time counted by the timer has reached a prescribed period of time or longer, the process advances to step S27. If the time counted by the timer has not reached the prescribed period of time, the process returns to step S24 to again determine whether the wheels on the side opposite the departure direction are contacting the rumble strips.

In step S27, the time counted by the timer is cleared, and time counting is ended. That is, the time counted by the timer is the time that has lapsed from the time point at which it is found that the wheels in the departure direction are contacting the rumble strips. If the counted time reaches a prescribed period of time or longer, the driver may notice that the vehicle tends to depart from the road because the wheels in the departure direction are contacting the rumble strips and steer back into the roadway. Therefore, the time counted by the timer is cleared, and the time counting is ended.

The control operation judgment part 20 determines the control operation for controlling the vehicle system 4 based on the road departure flag provided from the road departure judgment part 19 and the rumble strip detection flag provided from the rumble strip detecting part 17. The control operation judgment part 20 provides a control signal used for controlling each part of the vehicle system 4 to a seatbelt operation command value calculating part 21, an engine torque command value calculating part 22, a brake fluid pressure command value calculating part 23, a yaw moment command value calculating part 24, and an acceleration pedal repulsive force command value calculating part 25.

The seatbelt operation command value calculating part 21 calculates a seatbelt operation command value based on the result of the control operation judgment provided from the control operation judgment part 20 and supplies the command value to the seatbelt control device 44.

The engine torque command value calculating part 22 calculates an engine torque command value based on the result of the control operation judgment provided from the control operation judgment part 20 and supplies the command value to the engine control device 42.

The brake fluid pressure command value calculating part 23 calculates a brake fluid pressure command value based on the control operation judgment result provided from the control operation judgment part 20 and supplies that command value to the brake control device 41.

The yaw moment command value calculating part 24 calculates the yaw moment command value based on the control operation judgment result provided from the control operation judgment part 20 and supplies that command value to the brake control device 41.

The acceleration pedal repulsive force command value calculating part 25 calculates an acceleration pedal repulsive force command value based on the control operation judgment result provided from the control operation judgment part 20 and supplies that command value to the acceleration pedal control device 43.

Below, the overall operation and control for preventing road departure by using the vehicle control device having the aforementioned configuration will be explained.

Figure 3:
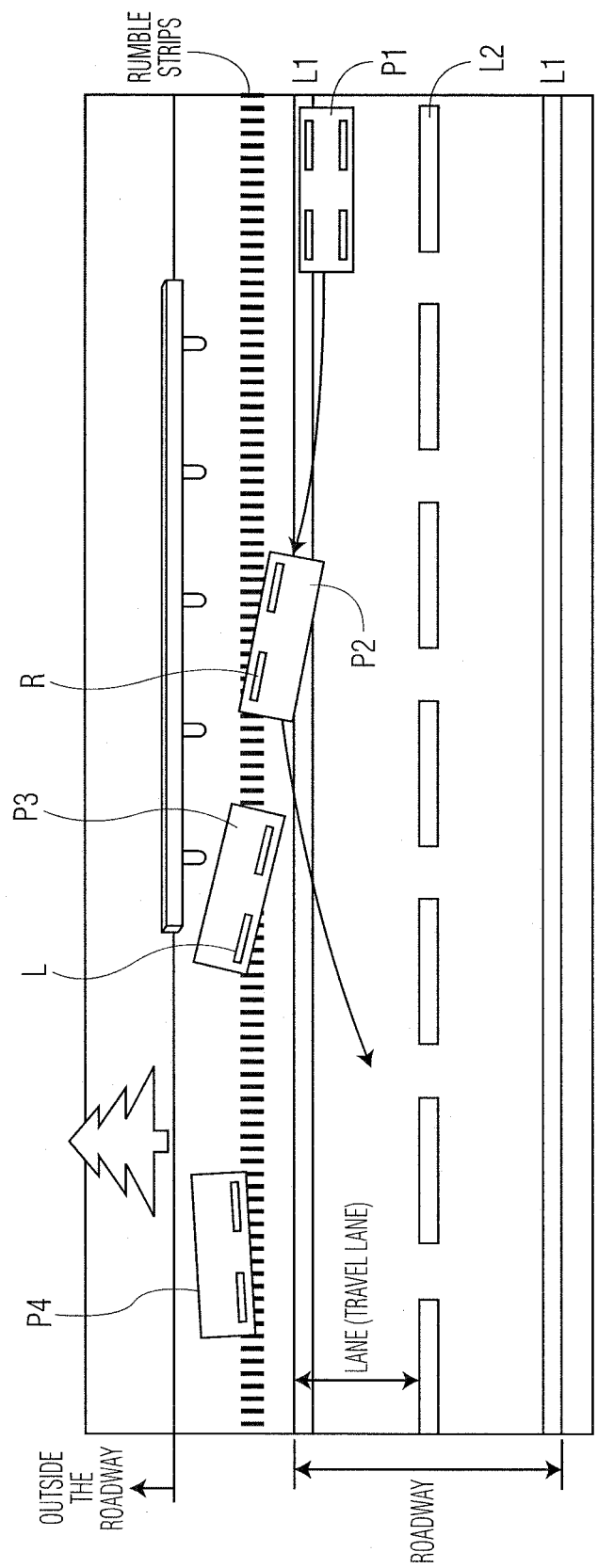
FIG. 3 is a diagram explaining the behavior of a vehicle when a vehicle control device disclosed in the present invention operates.

For example, as shown in FIG. 3, a vehicle travels from position P1, crosses the solid travel lane L1, and the right front wheel R runs over rumble strips RS at position P2. Subsequently, the left front wheel L runs over rumble strips RS at position P3 and travels to position P4. In the following, the operation in this case will be explained.

Figure 4:
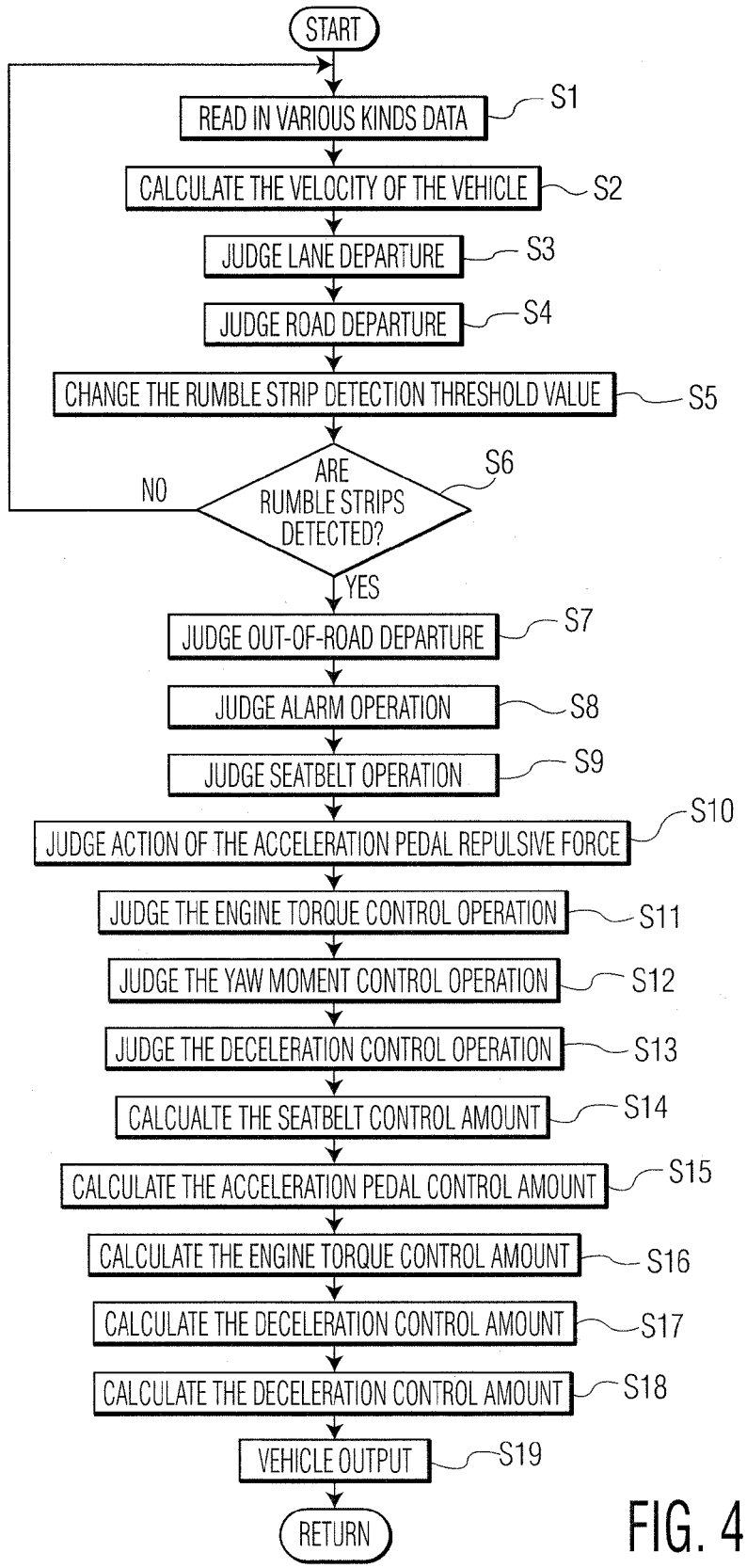
FIG. 4 is a flow chart illustrating the overall operation performed by a vehicle control device disclosed in the present invention.
Figure 5:
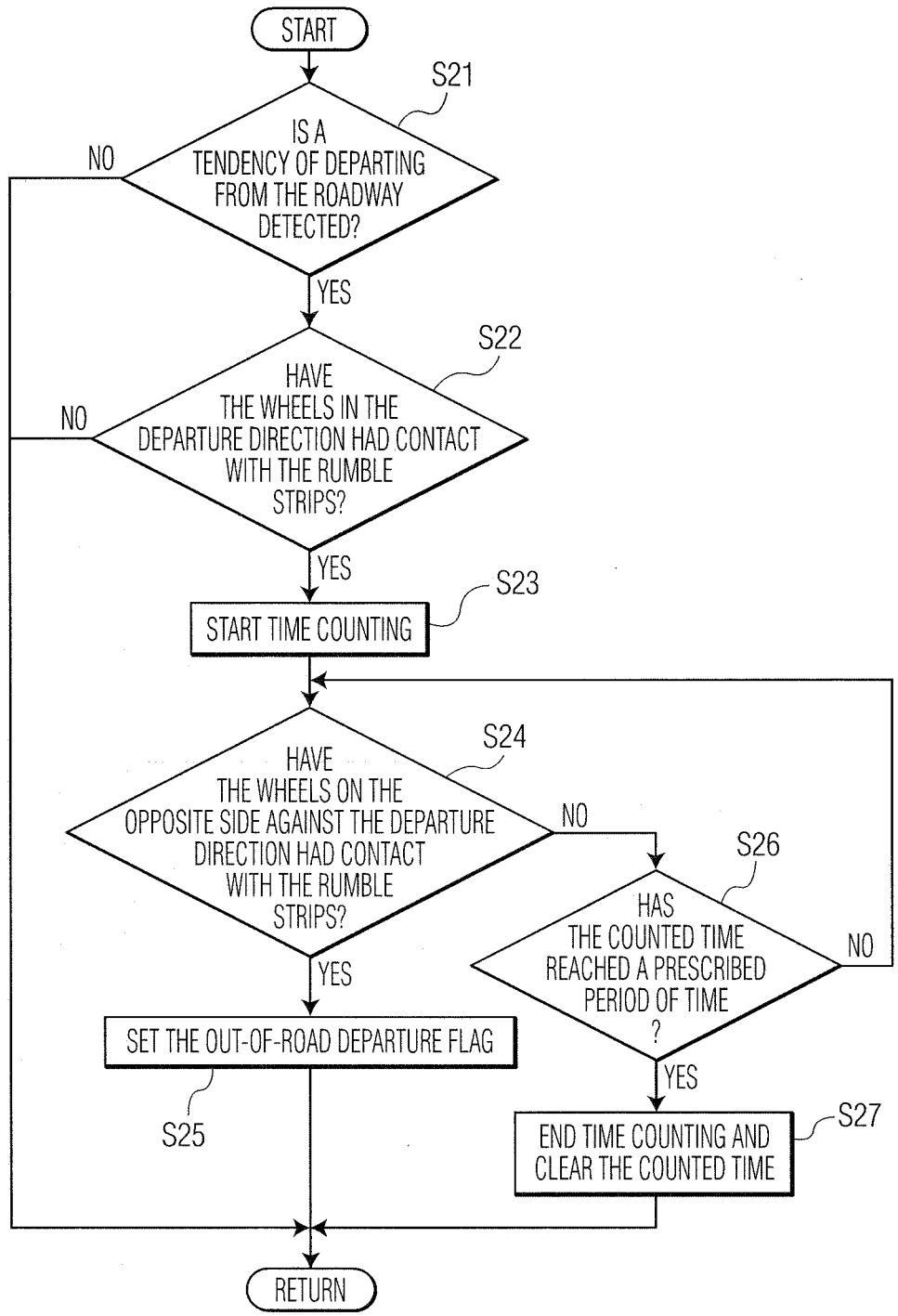
FIG. 5 is a flow chart illustrating the road departure judgment processing performed by a vehicle control device disclosed in the present invention.

The vehicle control device carries out the operation shown in FIG. 4 consecutively at a certain time interval when the vehicle is traveling.

First, in step S1, the controller 1 reads the camera image of the camera 2, the value detected by the wheel velocity sensor 3, and various kinds of pre-stored data. More specifically, the transverse displacement X, the yaw angle Φ, the curvature β of the travel lane, and the lane type L_class based on the camera image of the camera 2, and the velocity Vwi of each wheel (i=1-4) is read.

Then, in step S2, vehicle velocity V is calculated by the wheel velocity calculating part 14 of the controller 1. In this embodiment, the controller 1 calculates the vehicle velocity V as the average of velocities $Vw_1$ and $Vw_2$ of the front wheels in the case of a vehicle driven by the rear wheels during normal travel. More specifically, the controller 1 calculates vehicle velocity V based on the following equation 1.

$$V=(Vw_1+Vw_2)/2 \qquad \text{(Equation 1)}$$

If an ABS control system or other system using the vehicle velocity is in operation, it is also possible to use same the vehicle velocity as in that system.

Next, in step S3, the frequency threshold value (more specifically, the number of square waves in a predetermined prescribed period Ta) is set by the threshold value setting part 13. The frequency threshold value is derived for each wheel. The frequency threshold value of the right front wheel is vRS_FR_th. The frequency threshold value of the left front wheel is vRS_FL_th. The frequency threshold value of the right rear wheel is v_RS_RR_th. The frequency threshold value of the left rear wheel is v_RS_RL_th. The frequency threshold value setting part 13 sets the frequency threshold value of each wheel at a pre-stored prescribed value. The prescribed value must be a high value so that the state when the wheels do not contact rumble strips RS will not be misjudged as wheels contacting rumble strips RS. For example, a value of about 20 is set.

Still in step S3, lane departure is judged by the lane departure judgment part 11. In this case, the lane departure judgment part 11 determines whether lane departure occurs based on the transverse displacement X, the yaw angle Φ, and the curvature β of the travel lane based on the camera image read in step S1, and the vehicle velocity V calculated in step S2. The lane departure judgment part 11 first calculates the estimated departure amount. In this embodiment, the vehicle velocity V calculated in step S2 and the transverse displacement X, the yaw angle Φ, and the curvature β of the travel lane based on the camera image are used to calculate the estimated departure amount Xs in accordance with equation 2 below. The transverse displacement X, the yaw angle Φ, and the curvature β of the travel lane based on the camera image use the left direction as positive and the right direction as negative.

$$Xs = Tt \times V \times (\Phi + Tt \times V \times \beta) + X \qquad \text{(Equation 2)}$$

wherein, Tt is the time headway used for calculating the look-ahead-distance, and is a predetermined prescribed period of time. That is, estimated departure amount Xs represents the transverse displacement after the time headway (prescribed period of time).

Then, controller 1 compares the calculated estimated departure amount Xs with a predetermined departure judgment threshold value Xc (that is, a predetermined prescribed transverse displacement) to determine whether there is a possibility that the vehicle will depart from the lane. More specifically, the following rules (1) to (3) are applied.

(1) If the calculated estimated departure amount Xs is equal to or bigger than departure judgment threshold value Xc (Xs≥Xc), the controller 1 judges that the vehicle tends to depart to the left side and sets the lane departure judgment flag Fld to "LEFT".

(2) If the calculated estimated departure amount Xs is equal to or smaller than the negative value of departure judgment threshold value Xc (Xs≤−Xc), the controller 1 judges that the vehicle tends to depart to the right side and sets lane departure judgment flag Fld to "RIGHT".

(3) If neither case (1) nor case (2) is present, the controller 1 judges that the vehicle has no departure tendency and sets lane departure judgment flag Fld to "OFF".

Then, in step S4, the controller 1 determines whether roadway departure occurs with the aid of the roadway departure judgment part 12. The roadway departure judgment part 12 determines whether the vehicle tends to depart from the roadway based on the lane type L_class determined based on the camera image read in step S1 and the lane departure flag Fld set in step S4. For example, if the lane departure judgment flag Fld is "RIGHT" and the lane type L_class in the departure direction, which is the right direction, is a solid line, the roadway departure judgment part 12 sets the value of roadway departure flag Flg_road_depart at "1". Similarly, if the lane departure judgment flag Fld is "LEFT" and the lane type L_class in the departure direction, which is the left direction, is a solid line, the roadway departure judgment part 12 sets the value of roadway departure flag Flg_road_depart at "1". That is, if the lane type in the departure direction is a solid line when there is a lane departure tendency, the value of the roadway departure flag Flg_road_depart is set at "1". Otherwise, the value of the roadway departure flag Flgroad_depart is set at "0".

Then, in step S5, the threshold value setting part 13 changes the frequency threshold value. The details of the processing for changing the frequency threshold value will be described later.

Then, in step S6, the rumble strip detecting part 17 uses the frequency threshold value set in step S6 to detect whether each wheel of the vehicle is contacting the rumble strips. If it is found that any wheels of the vehicle is contacting the rumble strips, the process advances to step S7. Otherwise, the process returns to step S1.

Figure 6:
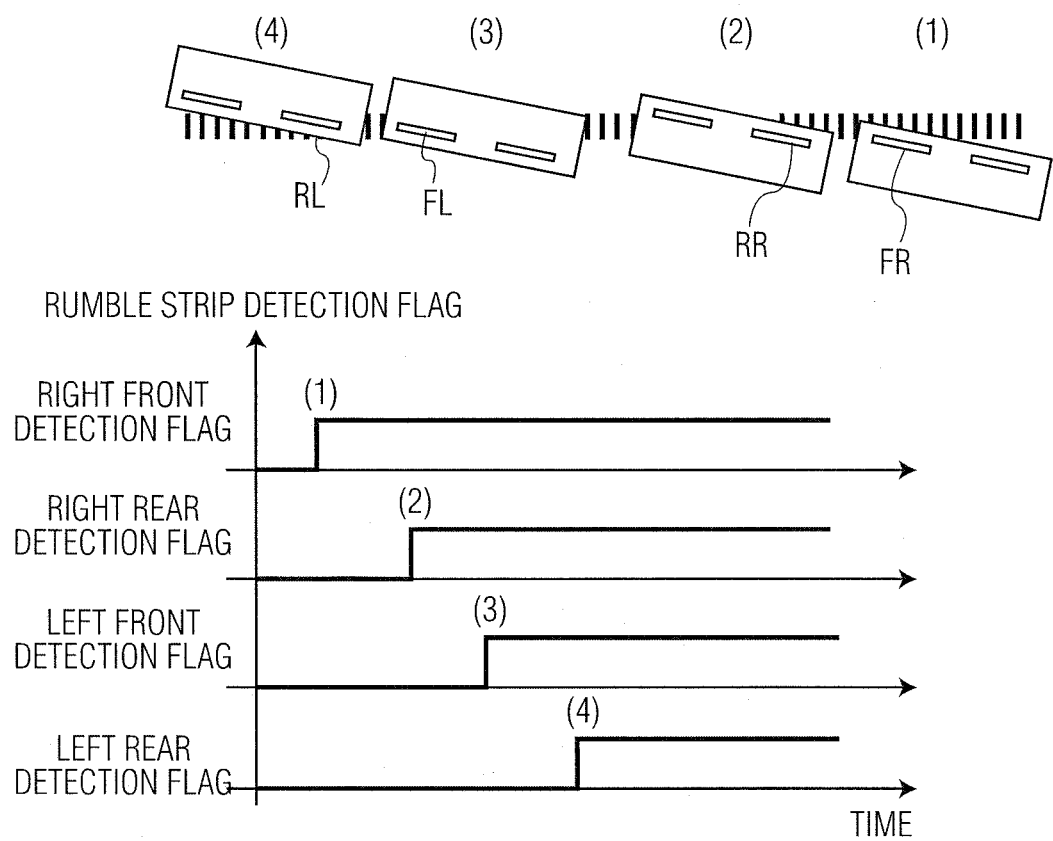
FIG. 6 is a timing chart illustrating the state when it is detected by a vehicle control device disclosed in the present invention that the vehicle has run over rumble strips.

Whether the rumble strips are being contacted is checked for each wheel. As shown in FIG. 6, when rumble strips RS are detected by the right front wheel FR as shown in (1), the right front wheel detection flag fRS_HIT_FR is set at "1". When rumble strips RS are detected by the left front wheel FL as shown in (3), the left front wheel detection flag fRS_HIT_FL is set at "1". When rumble strips RS are detected by the right rear wheel RR as shown in (2), the right rear wheel detection flag fRS_HIT_RR is set at "1". When rumble strips RS are detected by the left rear wheel RL as shown in (4), the left rear wheel detection flag fRS_HIT_RL is set at "1". The right front wheel detection flag fRS_HIT_FR, the left front wheel detection flag fRS_HIT_FL, the right rear wheel detection flag fRS_HIT_RR, and the left rear wheel detection flag fRS_HIT_RL are generally referred to as rumble strip detection flags.

The following explanation describes the control operation when rumble strips RS are detected by the front wheels. It, however, applies in the same way to the control operation when rumble strips RS are detected by the rear wheels. Also, the vehicle departs to the right side in the example to be described below. However, when the vehicle departs to the left side, the flags on the opposite side can be used to carry out the same processing.

In step S7, the road departure judgment part 19 determines whether there is a high possibility that the vehicle will depart from the road based on the rumble strip detection flag set in the rumble strip detecting part 17 and the roadway departure flag Flg_road_depart set by the roadway departure judgment part 12. If it is found that there is a high possibility that the vehicle will depart from the road, a road departure flag indicating that there is a high possibility that the vehicle will depart from the road is set.

Then, in step S8, the controller 1 determines the alarm operation of the alarm device 44 with the aid of the control operation judgment part 20. More specifically, the alarm operation is determined based on the road departure flag set in step S7 and the right front wheel detection flag fRS_HIT_FR, the left front wheel detection flag fRS_HIT_FL, the right rear wheel detection flag fRS_HIT_RR, and the left rear wheel detection flag_fRS_HIT_RL judged in step S7.

Figure 7:
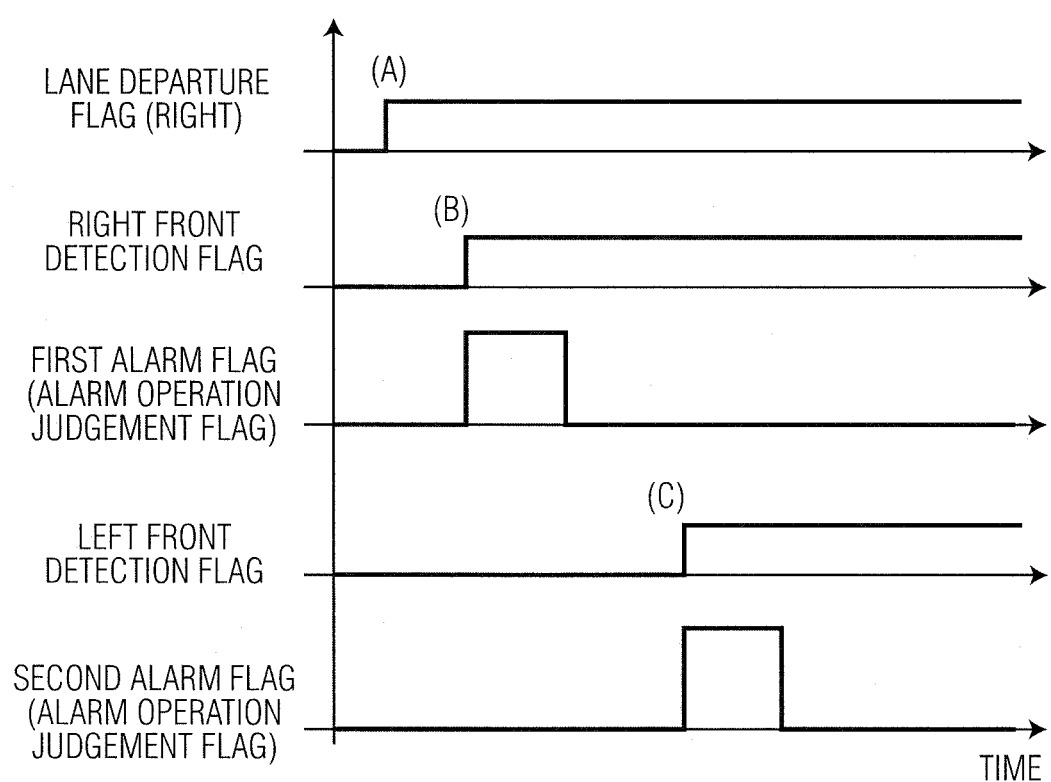
FIG. 7 is a timing chart explaining the alarm flag generated in a vehicle control device disclosed in the present invention.

For example, the case when the vehicle departs from the roadway to the right as shown in FIG. 3 will be explained based on FIG. 7. When the vehicle tends to depart from the roadway, the lane departure judgment flag Fld becomes "RIGHT" ((A) in FIG. 7). Subsequently, when the right front wheel detection flag fRS_HIT_FR becomes "1" ((B) in FIG. 7), although the road departure flag is not set, the right front wheel detection flag fRS_HIT_FR (rumble strip detection flag) is set at "1". In this case, the first alarm flag fWOW_FIRST is set as "fWOW_FIRST=1" with respect to road departure, and the first alarm operation is performed. Then, if the left front wheel detection flag fRS_HIT_FL becomes "fRS_HIT_FL=1" after the right front wheel detection flag fRS_HIT_FR is set at "1" ((C) in FIG. 7), the road departure flag is set, and the left front wheel detection flag fRS_HIT_FL (rumble strip detection flag) is set at "1". In this case, the second alarm flag fWOW_SECOND is set as "fWOW_SECOND=1", and the second alarm operation is performed with respect to road departure. The second alarm sends a clearer signal than the first alarm to notify the driver of the possibility that the vehicle will depart from the road. More specifically, for example, the second alarm has a louder alarm sound than the first alarm. Alternatively, the first alarm only has an alarm sound, while the second alarm also turns on an alarm light in addition to an alarm sound. The second alarm sends a stronger warning than the first alarm to the driver.

In this example, the first alarm flag fWOW_FIRST and the second alarm flag fWOW_SECOND are set with respect to right-side departure. The detection flags of the left wheels can be used to carry out the same processing for the left-side departure of departing to the left travel lane L1. In the following, similarly, the case in which the vehicle departs to the right direction from the travel lane as shown in FIG. 3 will be explained. However, the detection flags of the left wheels can be used to carry out the same processing with respect to left-side departure of departing to the left travel lane L1.

Then, in step S9, the controller 1 judges the seatbelt control operation with the aid of the control operation judgment part 20. More specifically, the seatbelt operation is judged corresponding to the road departure flag set in step S7, the left front wheel detection flag fRS_HIT_FL, and the right front wheel detection flag fRS_HIT_FR.

Figure 8:
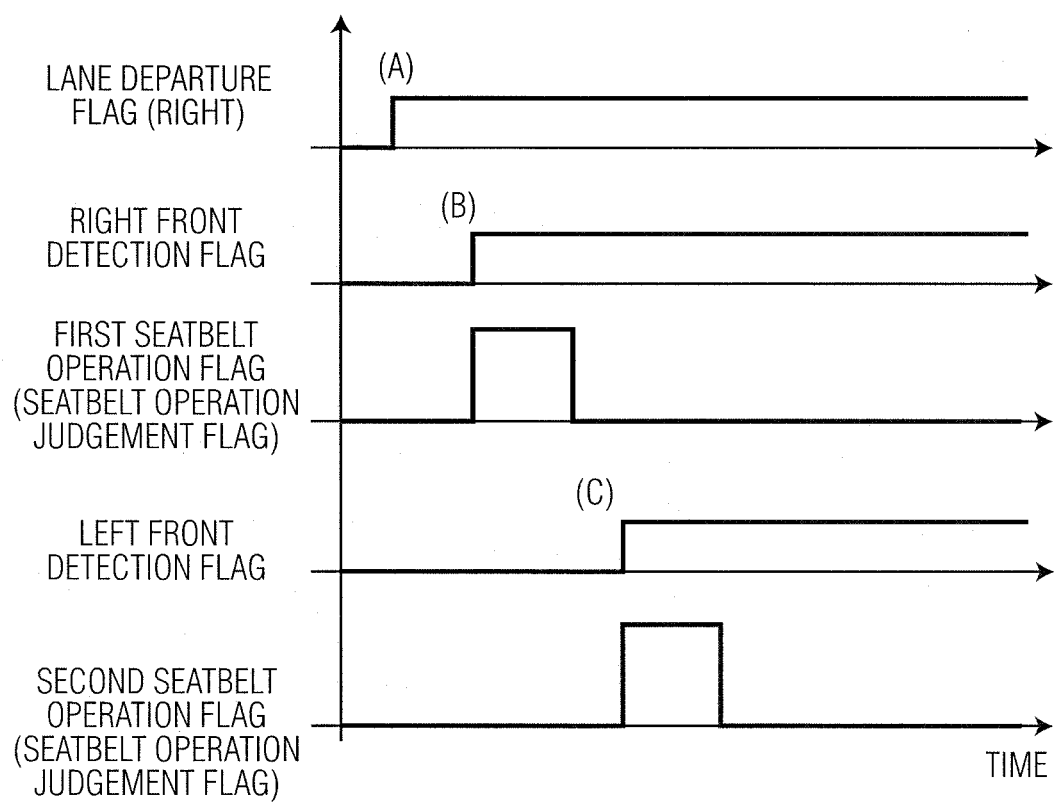
FIG. 8 is a timing chart for setting the seatbelt operation flag in a vehicle control device disclosed in the present invention.

For example, when a roadway departure tendency to the right side occurs, the lane departure judgment flag Fld becomes "RIGHT" ((A) in FIG. 8). Subsequently, if the right front wheel runs over rumble strips RS and the right front wheel detection flag fRS_HIT_FR becomes "1" ((B) in FIG. 8), although the road departure flag is not set, the right front wheel detection flag fRS_HIT_FR (rumble strip detection flag) is set at "1". In this case, the first seatbelt operation flag fPSB1_ACT becomes "1". Subsequently, if the left front wheel runs over rumble strips RS and the left front wheel detection flag fRS_HIT_FL becomes "1" ((C) in FIG. 8), the road departure flag is set, and the left front wheel flag fRS_HIT_FL (rumble strip detection flag) is set at "1". In this case, the second seatbelt operation flag fPSB2_ACT becomes "1".

Then, in step S10, the controller 1 judges the acceleration pedal control operation with the aid of the control operation judgment part 20. More specifically, the acceleration pedal control operation is judged corresponding to the road departure flag set in step S7, the left front wheel detection flag fRS_HIT_FL, and the right front wheel detection flag fRS_HIT_FR.

Figure 9:
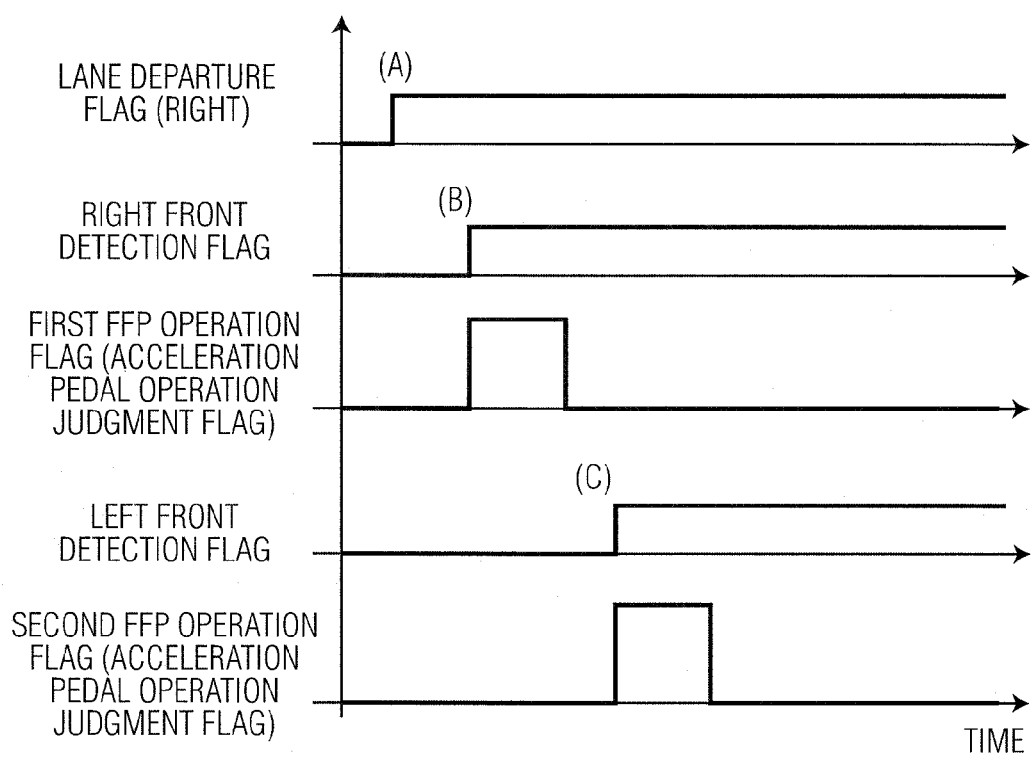
FIG. 9 is a timing chart for setting the acceleration pedal operation judgment flag in a vehicle control device disclosed in the present invention.

For example, when a roadway departure tendency to the right side occurs, the lane departure judgment flag Fld becomes "RIGHT" ((A) in FIG. 9). Subsequently, if the right front wheel runs over rumble strips RS and the right front wheel detection flag fRS_HIT_FR becomes "1" ((B) in FIG. 9), although the road departure flag is not set, the right front wheel detection flag fRS_HIT_FR (rumble strip detection flag) is set at "1". In this case, the first acceleration pedal operation flag fFFP1_ACT becomes "1". Subsequently, if the left front wheel runs over rumble strips RS and the left front wheel detection flag fRS_HIT_FL becomes "1" ((C) in FIG. 9), the road departure flag is set, and the left front wheel flag fRS_HIT_FL (rumble strip detection flag) is set at "1". In this case, the second acceleration pedal operation flag fFFP2_ACT becomes "1".

Then, in step S11, the controller 1 judges the engine torque control operation with the aid of control operation judgment part 20. More specifically, the engine torque control operation is judged corresponding to the road departure flag set in step S7, the left front wheel detection flag fRS_HIT_FL, and the right front wheel detection flag fRS_HIT_FR.

Figure 10:
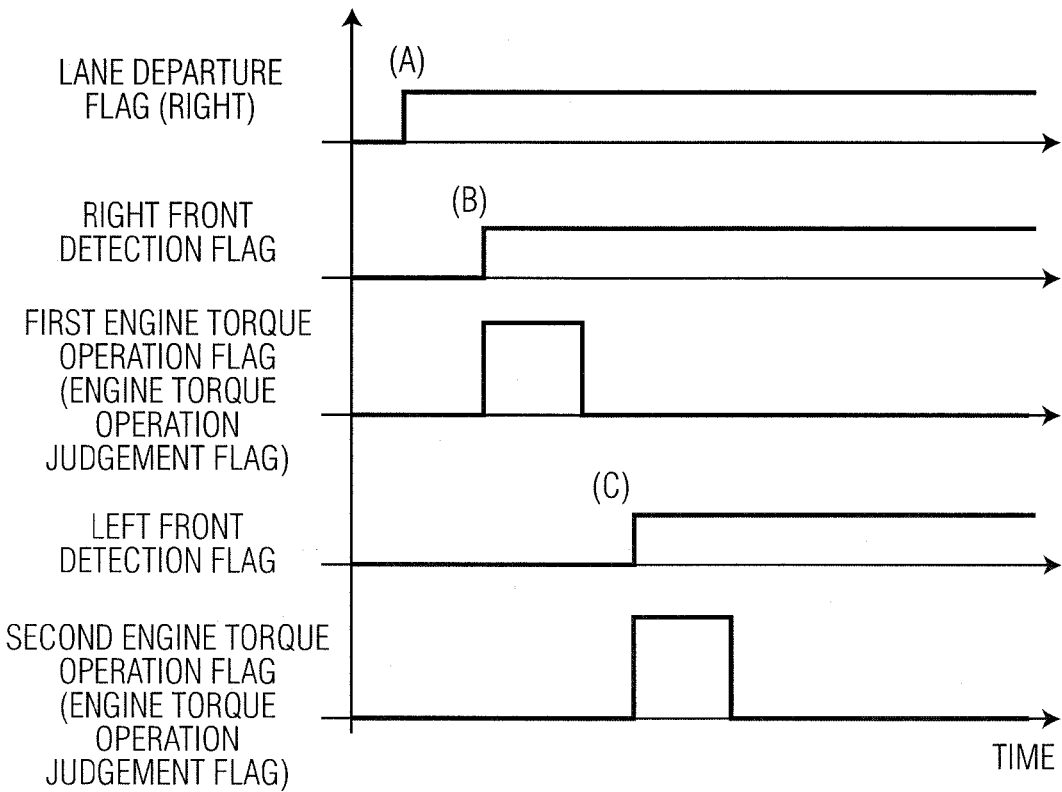
FIG. 10 is a timing chart for setting the engine torque operation flag in a vehicle control device disclosed in the present invention.

For example, when a roadway departure tendency to the right side occurs, the lane departure judgment flag Fld becomes "RIGHT" ((A) in FIG. 10). Subsequently, if the right front wheel runs over rumble strips RS and the right front wheel detection flag fRS_HIT_FR becomes "1" ((B) in FIG. 10), although the road departure flag is not set, the right front wheel detection flag IRS_HIT_FR (rumble strip detection flag) is set at "1". In this case, the first engine operation flag fETRQ1_ACT becomes "1". Subsequently, if the left front wheel runs over rumble strips RS and the left front wheel detection flag fRS_HIT_FL becomes "1" ((C) in FIG. 10), the road departure flag is set, and the left front wheel flag fRS_HIT_FL (rumble strip detection flag) is set at "1". In this case, the second engine operation flag fETRQ2_ACT becomes "1".

Then, in step S12, the controller 1 judges the yaw moment control operation with the aid of the control operation judgment part 20. More specifically, the yaw moment control operation is judged corresponding to the road departure flag set in step S7, the right front wheel detection flag fRS_HIT_FR, and the left front wheel detection flag fRS_HIT_FL.

Figure 11:
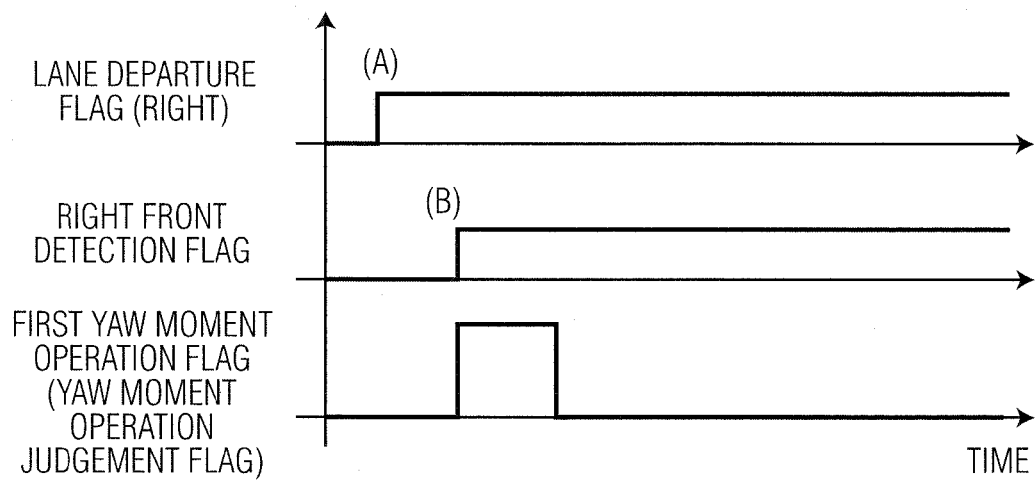
FIG. 11 is a timing chart for setting the yaw moment operation flag in a vehicle control device disclosed in the present invention.

For example, when a roadway departure tendency to the right side occurs, the lane departure judgment flag Fld becomes "RIGHT" ((A) in FIG. 11). Subsequently, if the right front wheel runs over rumble strips RS and the right front wheel detection flag fRS_HIT_FR becomes "1" ((B) in FIG. 11), although the road departure flag is not set, the right front wheel detection flag fRS_HIT_FR (rumble strip detection flag) is set at "1". In this case, the first yaw moment operation flag fMOM1_ACT becomes "1".

Then, in step S13, the controller 1 judges the deceleration control operation with the aid of the control operation judgment part 20. More specifically, the deceleration control operation is judged corresponding to the road departure flag set in step S7, the left front wheel detection flag fRS_HIT_FL, and the right front wheel detection flag fRS_HIT_FR.

Figure 12:
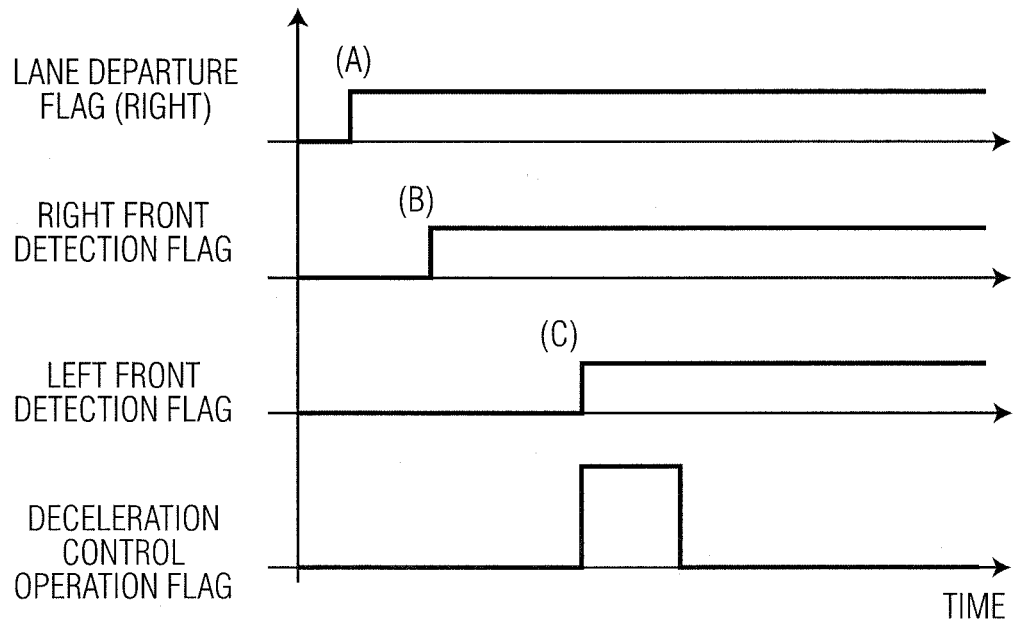
FIG. 12 is a timing chart for setting the deceleration control operation flag in a vehicle control device disclosed in the present invention.

For example, when a roadway departure tendency to the right side occurs, the lane departure judgment flag Fld becomes "RIGHT" ((A) in FIG. 12). Subsequently, if the right front wheel detection flag fRS_HIT_FR becomes "1" ((B) in FIG. 12) and the left front wheel detection flag fRS_HIT_FL becomes "1" ((C) in FIG. 12), the road departure flag is set. In this case, the deceleration operation flag fPCMD_ACT for decelerating the vehicle becomes "1".

Figure 13:
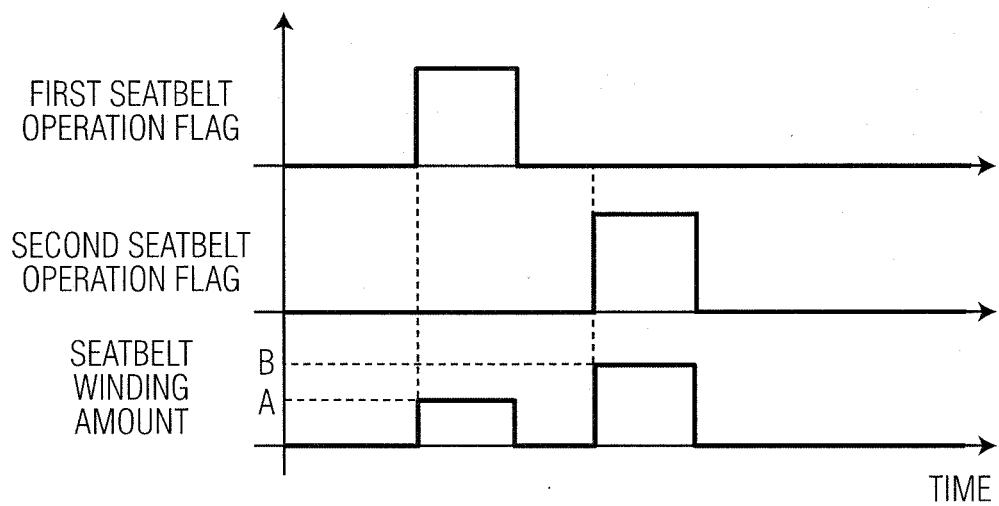
FIG. 13 is a timing chart of the seatbelt winding amount with respect to the seatbelt operation flag in a vehicle control device disclosed in the present invention.

Then, in step S14, the controller 1 calculates the seatbelt control amount with the aid of the seatbelt operation command value calculating part 21. As shown in FIG. 13, the seatbelt control amount is calculated corresponding to the seatbelt operation flag judged in step S9. For example, if the first seatbelt operation flag fPSB1_ACT becomes "1", the seatbelt is wound up by a predetermined prescribed winding amount known as A during a prescribed period of time to increase the tension of the seatbelt. After the first seatbelt operation, if the second seatbelt operation flag fPSB2_ACT becomes "1", the seatbelt is wound up by a winding amount of A-B with a bigger force than that during the first seatbelt operation.

Figure 14:
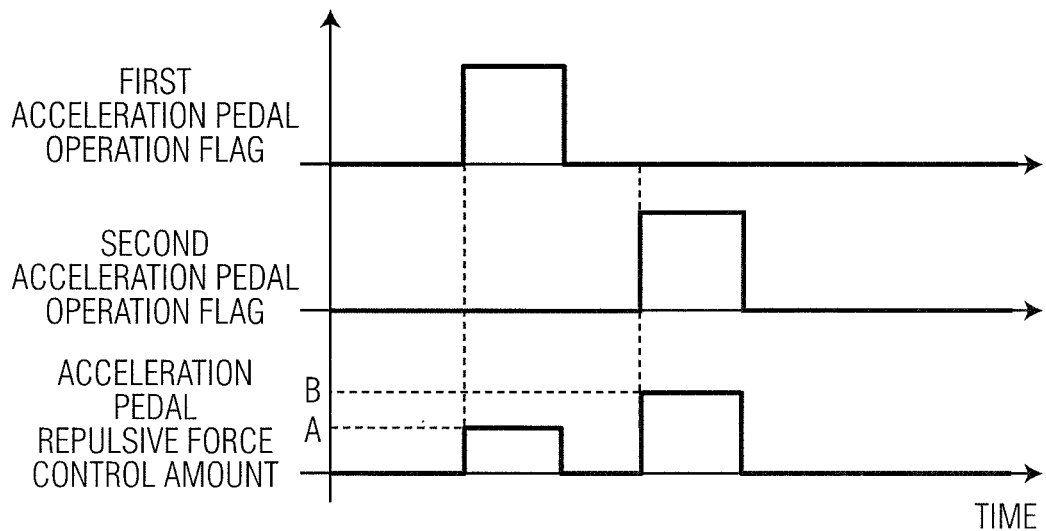
FIG. 14 is a timing chart of the acceleration pedal repulsive force with respect to the acceleration pedal operation judgment flag in a vehicle control device disclosed in the present invention.

Then, in step S15, the controller 1 calculates the acceleration pedal control amount with the aid of the acceleration pedal repulsive force command value calculating part 25. As shown in FIG. 14, the acceleration pedal control amount is calculated corresponding to the acceleration pedal operation flag judged in step S10. For example, if the first acceleration pedal operation flag fFFP1_ACT becomes "1", a command value is generated to increase the acceleration pedal repulsive force by a predetermined prescribed amount known as A during a prescribed period of time. In this case, a prescribed amount and prescribed period of time are used. However, it is also possible to operate until the yaw angle becomes 0 during departure. Also, if the second acceleration pedal operation flag fFFP2_ACT becomes "1" after the first acceleration pedal operation, a command value is calculated to generate an acceleration pedal repulsive force B bigger than the control amount A during the first acceleration pedal operation. It is also possible to calculate a command value corresponding to the departure degree.

Figure 15:
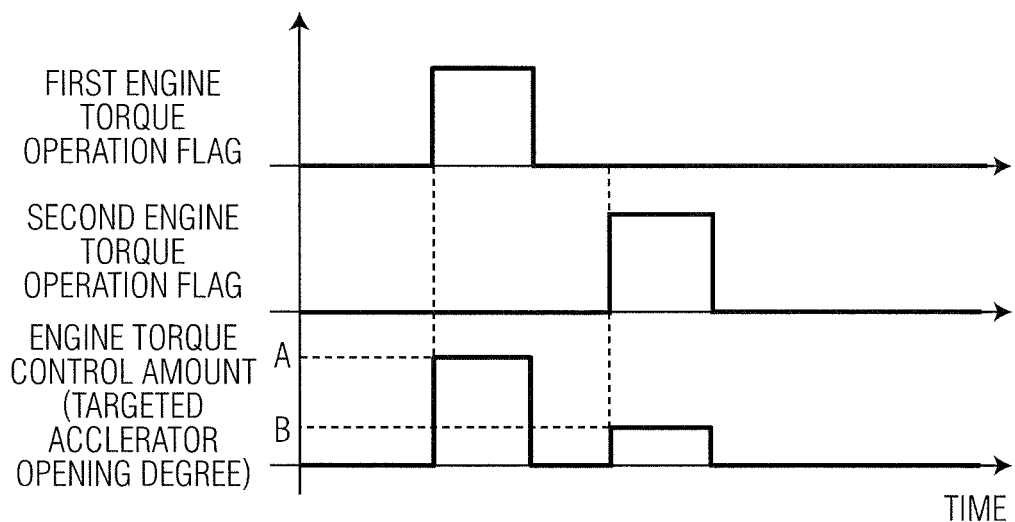
FIG. 15 is a timing chart of the engine torque control amount with respect to the engine torque operation flag in a vehicle control device disclosed in the present invention.

Then, in step S16, the controller 1 calculates the engine torque reduction control amount with the aid of the engine torque command value calculating part 22. As shown in FIG. 15, the engine torque reduction control amount is calculated corresponding to the engine torque operation flag judged in step S11. For example, when the first engine operation flag fETRQ1_ACT becomes "1", a command value is generated to reduce the engine driving torque by a predetermined prescribed engine torque reduction control amount A during a prescribed period of time and corresponding to the acceleration opening degree of the driver. If the second engine operation flag fETRQ2_ACT becomes "1" after the first engine control operation, a command value is calculated to generate a reduction control amount B bigger than the reduction control amount A during the first engine operation.

Figure 16:
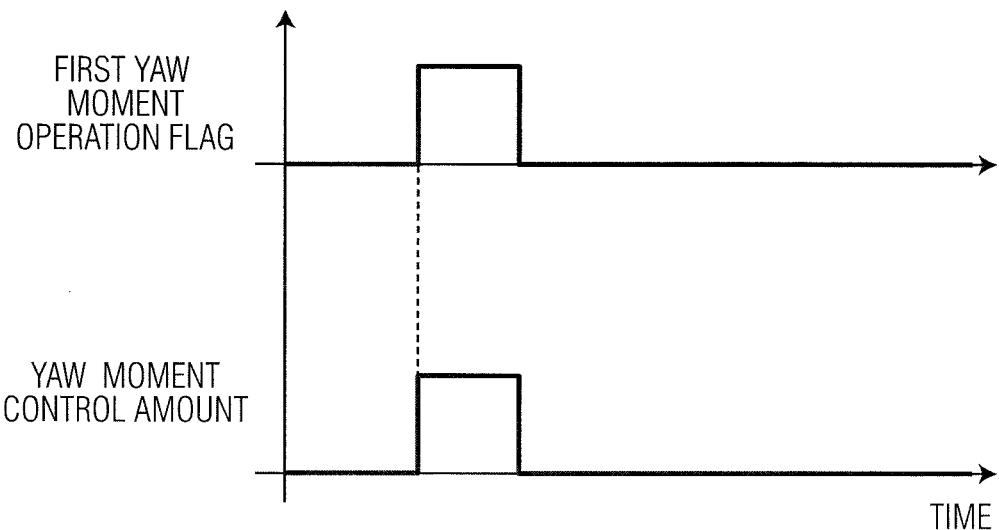
FIG. 16 is a timing chart of the yaw moment control amount with respect to the yaw moment operation flag in a vehicle control device disclosed in the present invention.

Then, in step S17, the controller 1 calculates the yaw moment control amount with the aid of the yaw moment command value calculating part 24. As shown in FIG. 16, the yaw moment control amount is calculated corresponding to the yaw moment operation flag judged in step S12. For example, when the first yaw moment operation flag fMOM1_ACT becomes "1", a command value is generated to operate a predetermined prescribed yaw moment control amount for a prescribed period of time (for example, 2 sec). It is also possible to vary the control amount corresponding to the yaw angle Φ of the vehicle within the travel lane during lane departure, the transverse displacement X from the lane center, and the velocity V of the vehicle and set the command value appropriately so that the yaw angle of the vehicle becomes a constant value. The command value based on the yaw moment control amount is calculated as the brake fluid pressure difference between the left and right wheels so that the target yaw moment is generated in the vehicle.

Figure 17:
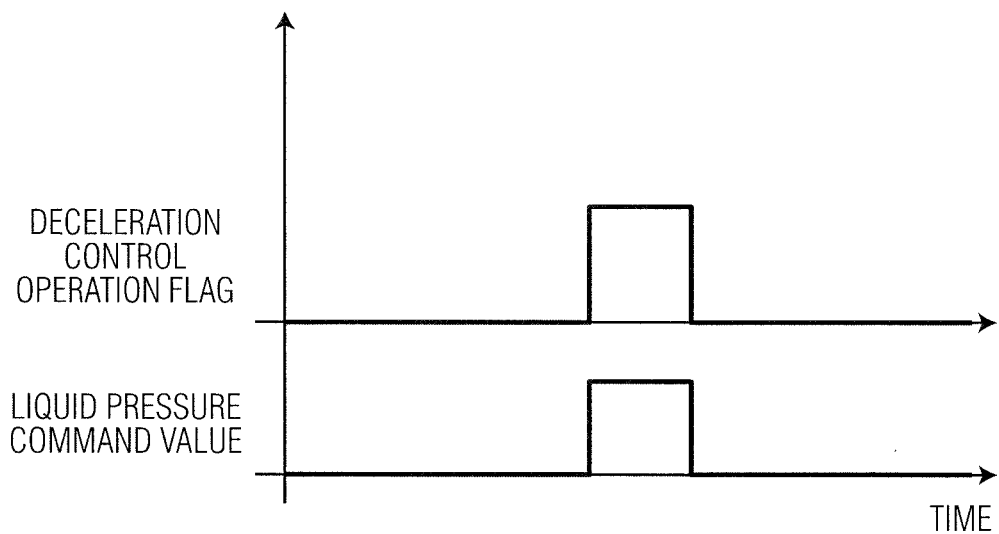
FIG. 17 is a timing chart of the deceleration command value with respect to the deceleration control operation flag in a vehicle control device disclosed in the present invention.

Then, in step S18, the controller 1 calculates the deceleration control amount with the aid of the brake fluid pressure command value calculating part 23. As shown in FIG. 17, the deceleration control amount is calculated corresponding to the deceleration operation flag judged in step S13. For example, when the deceleration operation flag fPCMD_ACT becomes "1", a command value is calculated to operate the brake of each wheel at a predetermined prescribed brake fluid pressure value for a prescribed period of time. It is also possible to generate a command value such that the deceleration control is continued until the vehicle velocity becomes 0.

Then, in step S19, the controller 1 outputs the control amount calculated in steps S14 through S18 to the vehicle system 4. In this way, the controller 1 controls the winding amount of the seatbelt depending on the seatbelt control device 44, the engine torque amount depending on the engine control device 42, the brake fluid pressure depending on the brake control device 41, and the acceleration pedal repulsive force depending on the acceleration pedal control device 43.

In the following, the process for detecting rumble strips RS by the controller 1 in step S6 of the vehicle control device operation, as described above will be explained based on FIG. 23.

First, in the wheel acceleration calculating part 15, the controller 1 detects the acceleration of each wheel. More specifically, the acceleration of each wheel is calculated, for example, by means of differentiation based on the velocity Vwi (i=1–4) of each wheel detected by the wheel velocity calculating part 14. At that time, the wheel acceleration calculating part 15 calculates the value after passing through a band-pass filter f_BP (Vwi) having a prescribed time constant as acceleration Avwi (i=1–4) of each wheel as shown in equation 3 below.

$$Avwi = f\_BP(Vwi)(i=1-4) \quad \text{(Equation 3)}$$

where f_BP is a function that represents the band-pass filter.

Then, the wheel acceleration calculating part 15 carries out limiter processing for upper and lower limits as shown by equation 4 below with respect to the wheel acceleration Avwi of each wheel.

$$Avwi\_limit = limit(Avwi)(i=1-4) \quad \text{(Equation 4)}$$

where limit ( ) is a function used for carrying out limiter processing for the upper and lower limits.

The rumble strip detecting part 17 generates the square wave of each wheel (square wave represented by 0 and 1) is generated with respect to the acceleration Avwi_limit (i=1–4) of each wheel that has undergone limiter processing in the wheel acceleration calculating part 15. More specifically, the square wave generating part 16 generates a square wave corresponding to each wheel based on equation 5 below.

$$Avwi\_pulse = f\_pulse(Avwi\_limit) \ (i=1-4) \quad \text{(equation 5)}$$

where f_pulse is a function used for generating the square waves.

More specifically, as shown in FIG. 23, the absolute value of the wheel acceleration Avwi_limit is compared with a prescribed amplitude threshold value A. If the absolute value of the wheel acceleration Avwi_limit is equal to or bigger than the prescribed amplitude threshold value A, the function has a result of 1. If the absolute value of the wheel acceleration Avwi_limit is smaller than the prescribed amplitude threshold value A, the function has a result of 0.

The rumble strip detecting part 17 carries out rumble strip detection processing. The rumble strip detecting part 17 counts the number of rising times of the square wave Avwi_pulse generated corresponding to each wheel during a prescribed period Ta (for example, 30 msec). If the counted value is equal to or bigger than the frequency threshold value set in step S5 (set by threshold value setting part 13), the values of the rumble strip detection flags (corresponding flags among the right front wheel detection flag fRS_HIT_FR, the left front wheel detection flag fRS_HIT_FL, the right rear wheel detection flag fRS_HIT_RR, and the rear left wheel detection flag fRS_HIT_RL) become "1".

The process for changing the frequency threshold value will be described below. In the aforementioned vehicle control device, the frequency threshold value setting part 13 changes the frequency threshold value as follows.

In the process for detecting rumble strips RS, when the vehicle is traveling in a travel lane, the frequency threshold value vRS_FR_th of the right front wheel, the frequency threshold value vRS_FL_th of the left front wheel, the frequency threshold value v_RS_RR_th of the right rear wheel, and the frequency threshold value v_RS_RL_th of the left rear wheel are set at a prescribed large value (for example, 20). The controller 1 sets the frequency threshold value at a large value so that it is possible to determine whether rumble strips RS are detected in step S7 during normal travel. When a prescribed condition (described below) is met, the controller 1 reduces the frequency threshold value so that contact of each wheel with rumble strips RS can be easily detected.

Figure 18:
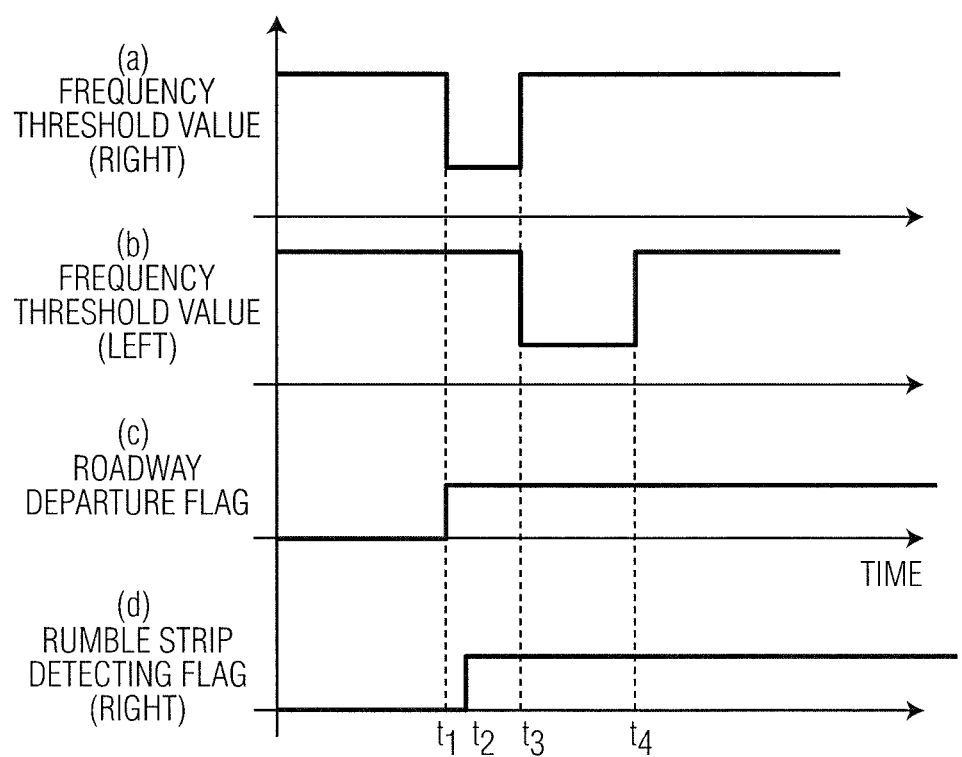
FIG. 18 is a timing chart illustrating the relationship between (a) the frequency threshold value of the right wheels, (b) the frequency threshold value of the left wheels, and (c) the transverse position of the vehicle in a vehicle control device disclosed in the present invention.

In the following, the processing for setting the frequency threshold value in the frequency threshold value setting part 13 will be explained based on an example in which a vehicle tends to depart from the travel lane toward the right direction. During the processing for changing the frequency threshold value, as shown in FIG. 18, at time t1, the lane departure judgment flag Fld becomes "RIGHT". When the roadway departure flag Flg_road_depart becomes "1" as shown in (c), the frequency threshold value of the departure direction (right wheels) is reduced (for example, set at 3) as shown in (a). On the other hand, the frequency threshold value of the left wheels is maintained at a constant value (the aforementioned prescribed value, for example, 20) as shown in (c).

When the right front wheel of the vehicle is contacting rumble strips RS at time t2, the contact with rumble strips RS is detected by the rumble strip detecting part 17, and the right front wheel detection flag fRS_HIT_FR becomes "1". At that time, since the frequency threshold value of the right front wheel has been reduced at time t1, the rumble strip detecting part 17 can accurately detect the fact that the right front wheel is contacting rumble strips RS. Also, since the frequency threshold value of the left wheels is maintained at the high value, misdetection indicating that the left wheels are contacting rumble strips RS due to the vibration of the vehicle caused by factors other than rumble strips can be prevented.

Subsequently, at time t3 that comes after a prescribed period of time since time t1, the frequency threshold value setting part 13 returns the frequency threshold value to the original value (for example, 20). The frequency threshold value setting part 13 returns the frequency threshold value to the original value after a prescribed period of time. However, it is also possible to return the frequency threshold value to the original value at time t2 when it is detected that the right wheels are contacting rumble strips RS. In this way, after the right wheels start contacting rumble strips RS, misdetection of the right wheels contacting rumble strips RS again can be prevented.

The frequency threshold value setting part 13 reduces the frequency threshold value of the left wheels to a prescribed value (for example, 3) at time t3. In this way, it is possible to accurately detect the fact that the vehicle further departs and the left wheels are contacting rumble strips RS after the right wheels have contacted rumble strips RS. The frequency threshold value setting part 13 returns the frequency threshold value of the left wheels to the original value at time point t4 that occurs after a prescribed period of time.

It is also possible to reduce the frequency threshold value gradually during a prescribed period of time. In addition, it is possible to change the frequency threshold values so that there is a difference between the frequency threshold value of the right wheels and the frequency threshold value of the left wheels. In this case, the frequency threshold value detecting value 13 reduces the frequency threshold value in order to detect the contact with rumble strips RS more reliably and increases the frequency threshold value in order to prevent misdetection of contact with rumble strips RS when the wheels have no contact with rumble strips RS.

As described above, by using the vehicle control device, when it is found by the roadway departure judgment part 12 that there is a roadway departure tendency, the frequency threshold value is set smaller than the frequency threshold value when it is found that there is no roadway departure tendency. When a lane departure tendency occurs, the vehicle control device can accurately detect the contact with rumble strips RS. If there is no lane departure tendency, misdetection of contact with rumble strips RS can be prevented. Thus, the vehicle control device can accurately detect the fact that a vehicle is contacting rumble strips RS. As described above, roadway departure is a form of lane departure. Consequently, when a lane departure tendency is detected (that is, when the lane departure judgment flag Fld is either "RIGHT" or "LEFT"), it is also possible to set the frequency threshold value to be smaller than when no lane departure tendency is detected. However, for example, on a roadway with two lanes, since the frequency threshold value is also set at a small value when there is a tendency for departure to the adjacent lane with a low possibility of having rumble strips, it is preferable to set the aforementioned frequency threshold value at a small value only when a roadway departure tendency is detected as described above.

Also, since the vehicle control device sets the frequency threshold value to be smaller corresponding to the wheels in the departure direction being judged to have a roadway departure tendency (or lane departure tendency), the fact that the wheels that may possibly be contacting rumble strips RS are actually contacting rumble strips RS can be detected accurately. Misdetection of contact with rumble strips RS can be prevented for other wheels.

In addition, since the vehicle control device returns the frequency threshold value of the wheels in the departure direction judged to have a roadway departure tendency (or lane departure tendency) to the original value at a prescribed period of time after setting the frequency threshold value to a smaller value, when the vehicle is returning toward the center of the travel lane while it is steered by the driver, misdetection caused by the reduced frequency threshold value can be avoided.

Moreover, the vehicle control device sets the frequency threshold value of the wheels in the departure direction judged to have a roadway departure tendency (or lane departure tendency) to be smaller a prescribed period of time after it is judged that the wheels on the side of the departure direction are contacting rumble strips RS. In this way, the vehicle control device can accurately detect that the wheels on the opposite side are contacting rumble strips RS after the wheels in the departure direction have contacted rumble strips RS. Also, since the vehicle control device returns the frequency threshold value of the wheels in the departure direction to the original value a prescribed period of time after the wheels in the departure direction are contacting rumble strips RS or after the value has been reduced, misdetection can be avoided.

In addition, since the vehicle control device returns the frequency threshold value of the wheels on the side opposite the departure direction judged to have a roadway departure tendency (or lane departure tendency) to the frequency threshold value before the smaller value is set after a prescribed period of time, when the vehicle travels toward the center of the lane while it is steered by the driver, misdetection caused by the reduced frequency threshold value can be avoided.

When it is found that there is a roadway departure tendency (or lane departure tendency), the vehicle control device sets the frequency threshold value at a smaller value. When it is detected that the wheels are contacting rumble strips RS, an appropriate yaw moment is applied to the vehicle to prevent the vehicle from departing from the roadway. In this way, the vehicle control device can accurately detect rumble strips RS and apply a yaw moment and appropriately control the behavior of the vehicle. Also, the vehicle control device can prevent misdetection of rumble strips RS and unnecessary generation of a yaw moment.

Also, when it is found that there is a roadway departure tendency (or lane departure tendency), the vehicle control device sets the frequency threshold value at a smaller value. When it is detected that the left or right wheels are contacting rumble strips RS, a yaw moment is applied to the vehicle. When it is detected that the wheels on the other side are contacting rumble strips RS within a prescribed period after the left or right wheels of the vehicle have contacted rumble strips RS, a deceleration is applied to the vehicle. In this way, the vehicle control device can accurately detect rumble strips RS and apply a yaw moment. If rumble strips RS are further detected subsequently, the vehicle control device can apply deceleration to the vehicle to appropriately control the behavior of the vehicle. This vehicle control device can prevent misdetection of rumble strips RS and unnecessary generation of a yaw moment or deceleration.

Figure 19:
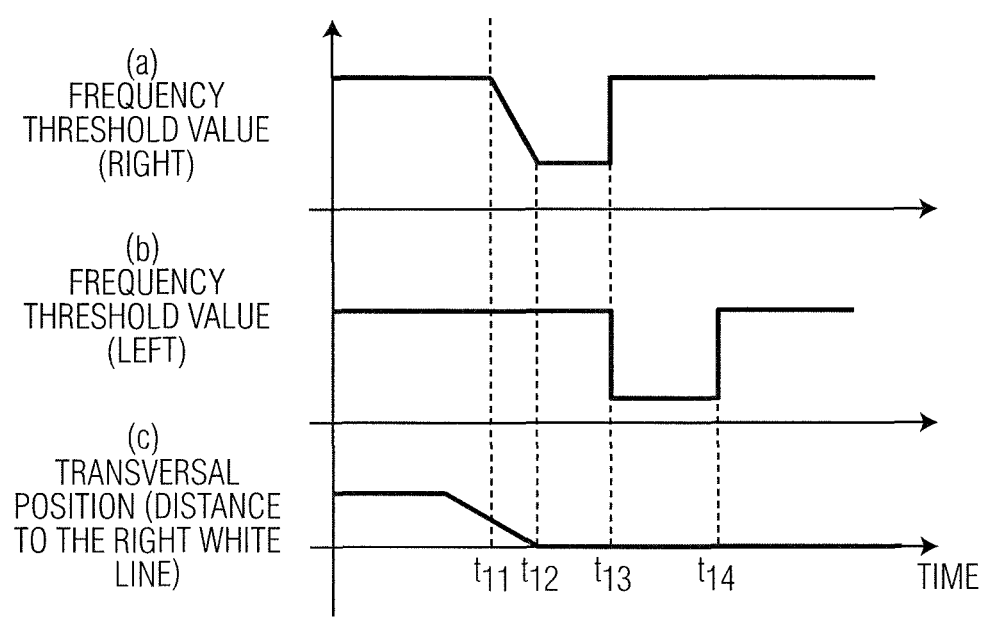
FIG. 19 is a timing chart illustrating the relationship between (a) the frequency threshold value of the right wheels, (b) the frequency threshold value of the left wheels, (c) the travel lane departure flag, and (d) the rumble strip detection flag of the right wheels.

In the following, a first modification example of the processing for changing the frequency threshold value will be explained with reference to FIG. 19. FIG. 19 shows a frequency threshold value changing processing that changes the frequency threshold value corresponding to the distance to the lane dividing line derived from the transverse displacement X from the lane center.

As shown in FIG. 19(c), when the distance to the right-side lane corresponding to the transverse position within the lane reaches a prescribed value or smaller at time t11, the distance to the right-side lane is detected by the frequency threshold value setting part 13. The frequency threshold value setting part 13 judges the distance to the right-side lane based on the transverse displacement X from the lane center based on the camera image picked up by the camera 2.

At that time, the frequency threshold value setting part 13 gradually reduces the frequency threshold value in the departure direction (right wheels) so that the distance to the right-side lane is gradually reduced from time t11 to time t12 as shown in FIG. 19(a). In this way, the frequency threshold value setting part 13 can gradually detect rumble strips RS at a high accuracy. In FIG. 19, the frequency threshold value is gradually reduced. However, it can also be reduced stepwise. On the other hand, the frequency threshold value of the left wheels is maintained at a constant value as shown in FIG. 19(b). In this example, it is also possible to change the frequency threshold values so that there is a difference between the frequency threshold value of the right wheels and the frequency threshold value of the left wheels.

The frequency threshold value setting part 13 returns the frequency threshold value of the right wheels to the original value at time t13 at a prescribed period of time after time t11 or t12. In this case, the frequency threshold value setting part 13 returns the frequency threshold value to the original value after a prescribed period of time. However, it is also possible to return the frequency threshold value to the original value after the right wheels have contacted rumble strips RS. Meanwhile, the frequency threshold value setting part 13 reduces the frequency threshold value of the left wheels to a prescribed value at time t13. The frequency threshold value setting part 13 returns the frequency threshold value of the left wheels to the original value at time t14 after a prescribed period of time.

As described above, the frequency threshold value setting part 13 reduces the frequency threshold value corresponding to the distance from the position of the vehicle to the lane dividing line as the solid travel lane L1 shown in FIG. 3. For the prescribed distance to the lane dividing line used for changing the frequency threshold value, in consideration of people who always drive on the right in the travel lane and people who always drive on the left in the travel lane based on the driving characteristics of the drivers, it is also possible to change the prescribed value of the transverse displacement X from the lane center used for changing the frequency threshold value depending on the position in the travel lane at which the vehicle usually travels. It is also possible to provide a non-sensing zone (deadband) of the transverse displacement X near the lane center. If there is movement in the transverse position beyond the non-sensing zone, the frequency threshold value is reduced.

As described above, when it is judged that there is a lane departure tendency corresponding to the transverse displacement X from the lane center, the vehicle control device sets the frequency threshold value to be smaller than the frequency threshold value when no lane departure tendency is found. In this way, the vehicle control device can accurately detect rumble strips RS when there is a lane departure tendency and can prevent misdetection of rumble strips RS when there is no lane departure tendency. Thus, the vehicle control device can accurately detect when the vehicle is contacting rumble strips RS.

Also, since the vehicle control device judges that there is a lane departure tendency when the distance between the transverse displacement X from the lane center and the lane dividing line is equal to or shorter than a prescribed distance, when there is a possibility that the vehicle will contacting rumble strips RS depending on the transverse displacement X from the lane center, the frequency threshold value can be reduced. Consequently, the vehicle control device can prevent misdetection without reducing the frequency threshold value when the possibility of reaching rumble strips RS is low.

Also, if the lane dividing line is a solid line, the vehicle control device can detect the distance between the solid lane dividing line and the transverse displacement X from the lane center and judge the lane departure tendency. Therefore, the frequency threshold value is reduced only when the vehicle departs from the solid lane dividing line and reaches rumble strips RS. Consequently, the vehicle control device can prevent misdetection without reducing the frequency threshold value when it is impossible for the vehicle to reach the rumble strips RS.

In addition, the vehicle control device judges that there is a lane departure tendency when the lane dividing line is a solid line and the distance between the solid lane dividing line and the position of the vehicle is equal to or shorter than a prescribed distance. Therefore, the frequency threshold value is reduced only when the vehicle goes beyond the solid lane dividing line and reaches rumble strips RS as shown in solid travel lane L1 shown in FIG. 3. Consequently, the vehicle control device can prevent misdetection without reducing the frequency threshold value when the possibility of reaching rumble strips RS is low.

A second modification example of the processing for changing the frequency threshold value is discussed below. In the previously discussed processing for changing the frequency threshold value, it is also possible to adjust the prescribed period of time for returning the frequency threshold value to the original value and reduce the frequency threshold value by frequency threshold value setting part 13.

Figure 20:
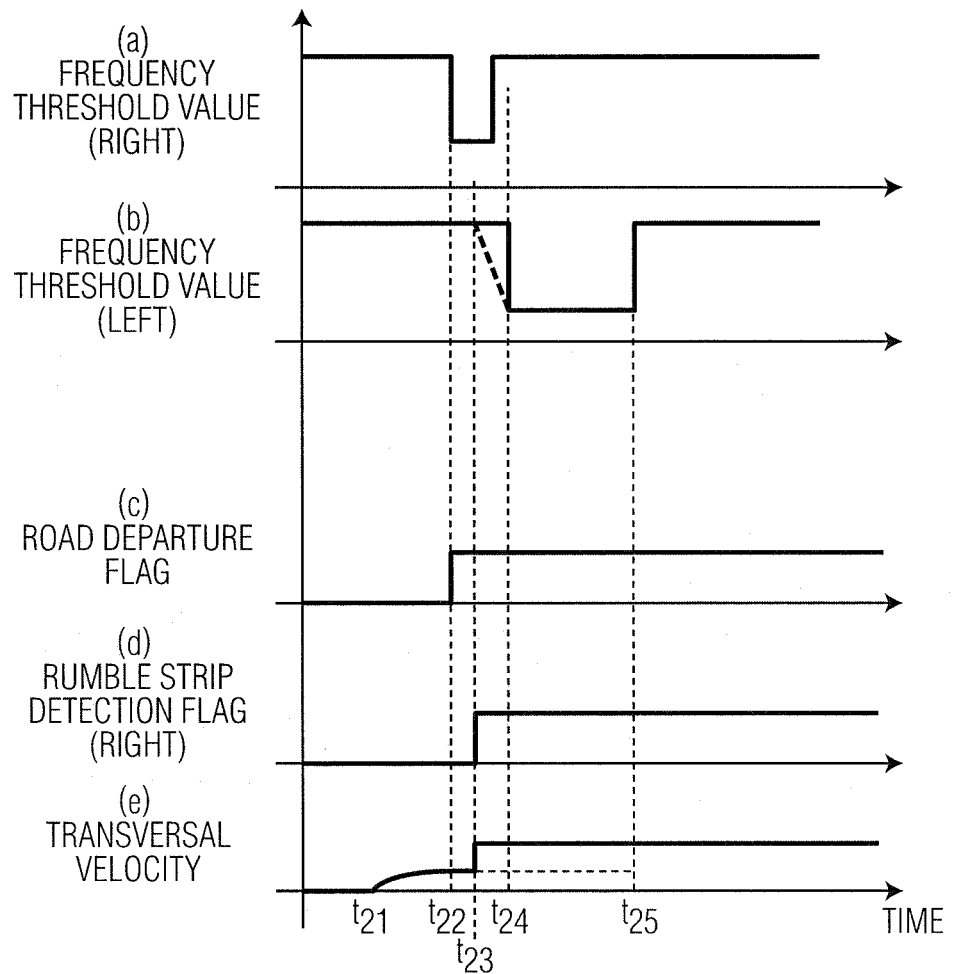
FIG. 20 is a timing chart illustrating the relationship between (a) the frequency threshold value of the right wheels, (b) the frequency threshold value of the left wheels, (c) the travel lane departure flag, (d) the rumble strip detection flag of the right wheels, and (e) the transverse velocity in a vehicle control device disclosed in the present invention.

When contact with rumble strips RS is detected for the right wheels as shown in FIG. 20(d), the transverse velocity in FIG. 20(e) is detected by the frequency threshold value setting part 13 based on the camera image obtained by the camera 2. The transverse velocity is gradually increased from time t21 when the vehicle moves from the center of the travel lane toward the lane dividing line. Subsequently, if the transverse velocity is still present, at time t21, roadway departure to the right side is detected by the lane departure judgment part 11 and the roadway departure judgment part 12, and the roadway departure flag Flg_road_depart is set as When the roadway departure flag Flg_road_depart is set as "1", the frequency threshold value setting part 13 reduces the frequency threshold value of the wheels (right wheels) in the departure direction (right side) as shown in FIG. 20(a). Then, the frequency threshold value setting part 13 estimates the time until the left wheels on the side opposite the departure direction pass through rumble strips RS based on the transverse velocity. The frequency threshold value setting part 13 reduces the frequency threshold value of the left wheels at a rate of reducing the frequency threshold value of the left wheels to a prescribed value within the estimated time. In this way, the frequency threshold value of the left wheels is reduced to a prescribed value from time t23 to t24 at a rate estimated for the left wheels to contact rumble strips RS based on the transverse velocity at time t22 as shown in FIG. 20(*b*).

It is also possible for the frequency threshold value setting part 13 to lower the frequency threshold value of the left wheels stepwise at time t24 estimated for the left wheels to contact rumble strips RS. The frequency threshold value setting part 13 can also use the transverse velocity at time t22 when roadway departure occurs or at time t23 when contact with rumble strips RS occurs to estimate the timing for the left wheels to contact rumble strips RS. The frequency threshold value setting part 13 can also use the transverse acceleration or the movement amount in the transverse direction instead of the transverse velocity to estimate the timing for the left wheels to contact rumble strips RS.

Subsequently, the frequency threshold value setting part 13 returns the frequency threshold value of the left wheels to the original value at time t25 that is a prescribed period of time after the frequency threshold value of the left wheels has been reduced. It is also possible to return the frequency threshold value of the left wheels to the original value when rumble strips RS are detected for the left wheels.

After the vehicle control device finds that the wheels on the side of the departure direction judged to have a lane departure tendency are contacting rumble strips RS, it uses at least the transverse velocity of the vehicle to adjust the prescribed time for reducing the frequency threshold value of the wheels on the side opposite the departure direction. In this way, the vehicle control device can reduce the frequency threshold value in a shorter period of time when the transverse velocity increases. The vehicle control device can reduce the frequency threshold value at a timing estimated for the wheels on the side opposite the departure direction to contact rumble strips RS. In this way, it is possible to reduce the frequency threshold value when there is a high possibility of contacting rumble strips RS so as to detect rumble strips RS at high accuracy and prevent misdetection.

Also, the vehicle control device can change the frequency threshold value of the wheels on the side opposite the departure direction judged to have a lane departure tendency to a prescribed small value at a prescribed rate within a prescribed period of time estimated from the transverse velocity of the vehicle. In this way, the vehicle control device can reduce the frequency threshold value when there is a high possibility of contacting rumble strips RS so as to detect rumble strips RS at high accuracy and prevent misdetection.

Below, a third modification example of the processing for reducing the frequency threshold value will be explained.

In the processing for changing the frequency threshold value, it is also possible to change the rate when reducing the frequency threshold value of the wheels in the departure direction judged to have a lane departure tendency corresponding to the type of road on which the vehicle is traveling. The controller 1, for example, may be connected to a navigation device not shown in the figure. The current position of the vehicle based on a GPS signal from the navigation device and information indicating the type of road on which the vehicle is traveling are provided to the controller 1.

Figure 21:
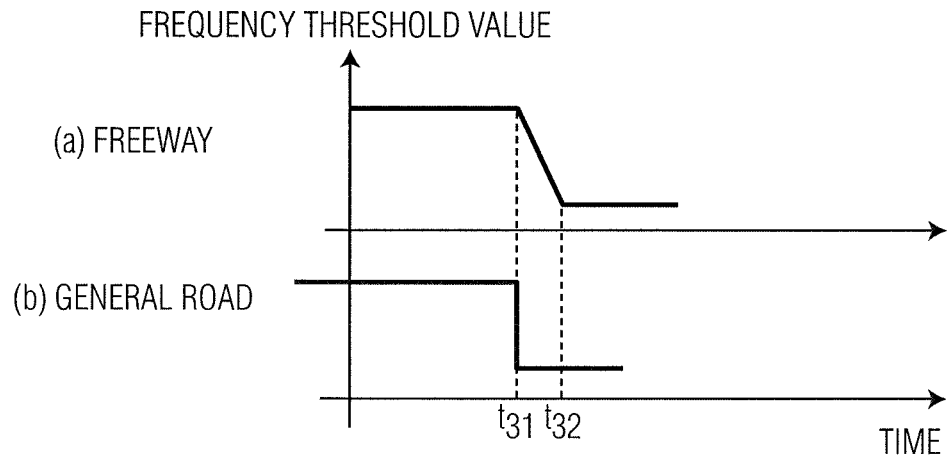
FIG. 21 is a timing chart illustrating (a) the frequency threshold value for a freeway and (b) the frequency threshold value for a general road in a vehicle control device disclosed in the present invention.

If the road on which the vehicle is traveling is a freeway or highway, as shown in FIG. 21(*a*), the frequency threshold value setting part 13 reduces the frequency threshold value gradually at a prescribed rate from time t31 judged as the time for reducing the frequency threshold value to time t32. The time t31 is determined based on the transverse displacement X from the lane center and the roadway departure flag Flg_road_depart. If the road on which the vehicle is traveling is a general road, as shown in FIG. 21(*b*), the frequency threshold value setting part 13 lowers the frequency threshold value stepwise at time t31 judged for lowering the frequency threshold value.

The road type information can also be the category of road type. It is also possible to change the period (t31-t32) for gradually reducing the rumble strip detecting threshold value toward a higher category including, for example, a freeway. Then, it is also possible to shorten the period (t31-t32) toward a lower category including, for example, a general road, and stepwise reduce the rumble strip detecting threshold value.

As described above, the vehicle control device can detect rumble strips RS at high accuracy and prevent misdetection corresponding to the road type by changing the rate of reducing the frequency threshold value corresponding to the road type. That is, since the vehicle can be steered back into the travel lane by the driver even if the wheels are contacting rumble strips RS on a freeway with a wide shoulder, the period for reducing the frequency threshold value is prolonged so that it is more difficult to detect rumble strips RS. On the other hand, since it is possible for the vehicle to hit a wall or the like after contacting rumble strips RS on a general road having no shoulder, rumble strips RS can be lowered stepwise so that rumble strips RS can be detected reliably.

Below, a fourth modification example of the processing for changing the frequency threshold value will be explained.

In the processing for changing the frequency threshold value, it is also possible to change the rate used when reducing the frequency threshold value of the wheels in the departure direction judged to have a lane departure tendency corresponding to the type of road on which the vehicle is traveling and the departure direction judged to have the lane departure tendency.

Figure 22:
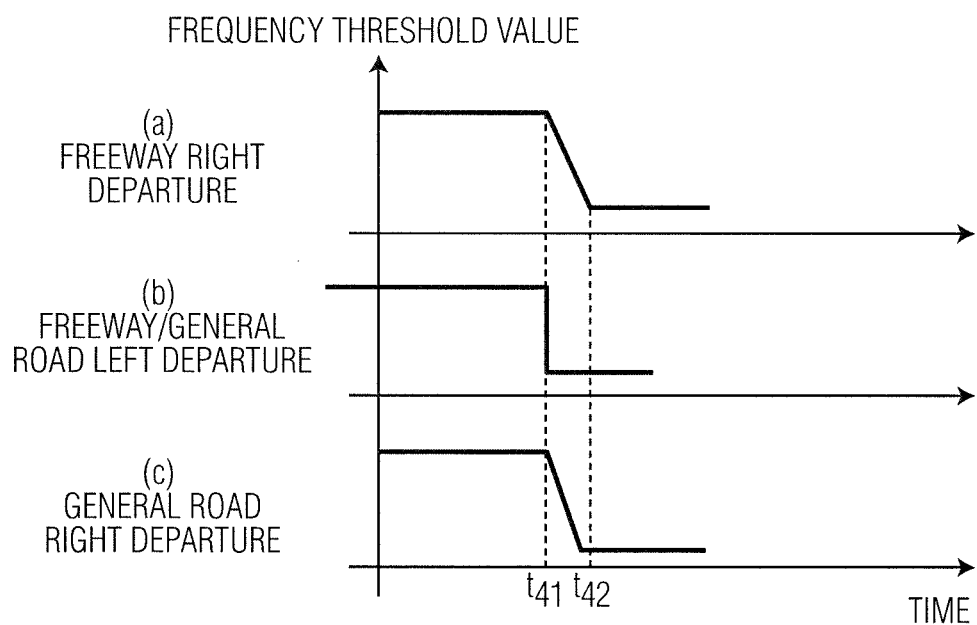
FIG. 22 is a timing chart illustrating (a) the frequency threshold value when a tendency for departure to the right side of the travel lane occurs on a freeway, (b) the frequency threshold value when a tendency for departure to the left side of the travel lane on a freeway or general road occurs, and (c) the frequency threshold value when a tendency for departure to the right side of the travel lane on a general road occurs in a vehicle control device disclosed in the present invention.

If the road on which the vehicle is traveling is a freeway or a highway, and the departure direction is the right side on a highway having a shoulder on the right side, as shown in FIG. 22(*a*), the frequency threshold value setting part 13 can reduce the frequency threshold value gradually at a prescribed rate from time t41 judged as the time for reducing the frequency threshold value to time t42. The time t41 is determined based on the transverse displacement X from the lane center and the roadway departure flag Flg_road_depart as described above.

If the road on which the vehicle is traveling is a freeway or a general road and the left side with no shoulder is the departure direction, as shown in FIG. 22(*b*), the frequency threshold value setting part 13 reduces the frequency threshold value stepwise at time t41 judged as the time for reducing the frequency threshold value.

If the road on which the vehicle is traveling is a general road and the departure direction is the right side on the general road having a shoulder on the right side, as shown in FIG. 22(*c*), the frequency threshold value setting part 13 reduces the frequency threshold value gradually at a prescribed rate over a short period from time t41 judged as the time for reducing the frequency threshold value to time t42. Therefore, the frequency threshold value setting part 13 can reduce the frequency threshold value at a rate greater than that shown in FIG. 22(*a*).

As described above, the vehicle control device can detect rumble strips RS at a high accuracy and prevent misdetection corresponding to the road type and the departure direction by changing the rate used for reducing the frequency threshold value corresponding to the road type and departure direction. That is, if the vehicle departs in a direction in which a shoulder is present, the frequency threshold value is reduced at a sharper rate for a general road than for a freeway. However, if the vehicle departs to the left side where there is no shoulder on a freeway or general road, it is necessary to accurately detect rumble strips RS provided on the lane in the opposite direction. Therefore, when the vehicle departs in a direction having no shoulder, frequency threshold value setting part 13 stepwise lowers rumble strips RS. In this way, the vehicle control device can reduce the frequency threshold value appropriately corresponding to the road type and the departure direction.

Second Embodiment

In the aforementioned embodiment, the threshold value setting part 13 changes the frequency threshold value. That is, when it is found that there is a roadway departure tendency (or lane departure tendency), the frequency threshold value is set at a smaller value. The threshold value used for detecting rumble strips and set by the threshold value setting part 13 can also be an amplitude threshold value instead of a frequency threshold value. In other words, when it is found that there is a roadway departure tendency (or lane departure tendency), the amplitude threshold value (that is, threshold value A in FIG. 23) is reduced. When it is judged that there is no roadway departure tendency (or lane departure tendency), the amplitude threshold value (that is, threshold value A in FIG. 23) is increased. In this way, the same effect as that of the first embodiment can be realized. The rest of the configuration is the same as that used for setting the frequency threshold value in the aforementioned embodiment and will not be explained again. Of course, it is also possible to reduce both the frequency threshold value and the amplitude threshold value when it is found that there is a roadway departure tendency (or lane departure tendency) and increase both of the threshold values when it is judged that there is no roadway departure tendency (or lane departure tendency).

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A vibration applying structure detecting device for a wheeled vehicle traveling on a roadway having a vibration applying structure on a road surface in or adjacent to the roadway, comprising:
    a lane departure judgment device that determines whether there is a lane departure tendency based on camera image taken by a vehicle mounted camera;
    a vibration detecting device that determines the frequency and the amplitude of input vibration from a road surface to the vehicle;
    a contact judgment device that determines that at least one of the wheels of the vehicle is contacting the vibration applying structure when the input vibration with an amplitude equal to or greater than a prescribed vibration amplitude threshold value has a frequency that is equal to or greater than a prescribed vibration frequency threshold value;
    a threshold value setting device that sets one or both of the vibration amplitude threshold value and the vibration frequency threshold value;
    wherein when it is judged by the lane departure tendency judgment device that there is a lane departure tendency, the threshold value setting device sets one or both of the vibration frequency threshold value and the vibration amplitude threshold value to a value smaller than that when it is judged that there is no lane departure tendency; and
    wherein the threshold value setting device returns the vibration frequency threshold value and/or vibration amplitude threshold value of the wheels in a departure direction judged to have a lane departure tendency to the vibration frequency threshold value and/or vibration amplitude threshold value before it was reduced after a first prescribed period of time has passed since the vibration frequency threshold value and/or vibration amplitude threshold value was reduced.

2. The vibration applying structure detecting device of claim 1,
    wherein the lane departure judgment device detects the lane dividing line of the travel lane in which the vehicle is traveling, the position of the vehicle in the travel lane in which the vehicle is traveling, and the distance between the position of the vehicle in the travel lane and the lane dividing line, and judges that there is a lane departure tendency when the detected distance is equal to or shorter than a prescribed distance.

3. The vibration applying structure detecting device of claim 1,
    wherein when it is judged by the lane departure judgment device that there is a lane departure tendency, the threshold value setting device determines whether the lane dividing line in the departure direction is a lane dividing line at the edge of the roadway; and
    wherein if the detected lane dividing line is a lane dividing line at the edge of the roadway, the one or both of the vibration frequency threshold value and the vibration amplitude threshold value is set to a value smaller than that when it is judged that there is no lane departure tendency.

4. The vibration applying structure detecting device of claim 1,
    wherein the lane departure judgment device determines whether there is the lane departure tendency and detects the departure direction of the lane departure;
    wherein the vibration detecting device detects the vibration input to each of the left and right wheels of the vehicle from the road surface as the vibration input to the vehicle;
    wherein the contact judgment device determines whether each of the left and right wheels is contacting the vibration applying structure by determining whether the frequency of the vibration with an amplitude equal to or greater than a prescribed vibration amplitude threshold value is equal to or greater than a prescribed frequency with respect to each detected vibration input to each of the left and right wheels; and
    wherein the threshold value setting device sets only the vibration frequency threshold value and/or the vibration amplitude threshold value corresponding to the wheels in the departure direction judged to have a lane departure tendency to a value smaller than that when it is judged that there is no lane departure tendency.

5. The vibration applying structure detecting device of claim 4,
wherein the threshold value setting device reduces the vibration frequency threshold value and/or vibration amplitude threshold value of the wheels on the opposite side of the departure direction judged to have a lane departure tendency after a second prescribed period of time from the time at which it is judged that the wheels on the side of the departure direction are contacting the vibration applying structure.

6. The vibration applying structure detecting device of claim 5,
wherein the threshold value setting device returns the vibration frequency threshold value and/or vibration amplitude threshold value of the wheels on the opposite side of the departure direction judged to have a lane departure tendency to the vibration frequency threshold value and/or vibration amplitude threshold value after the second prescribed period of time from the time at which it was reduced after the first prescribed period of time.

7. The vibration applying structure detecting device of claim 4,
wherein the threshold value setting device reduces the vibration frequency threshold value and/or vibration amplitude threshold value of the wheels in the departure direction judged to have a lane departure tendency at a rate corresponding to the type of road on which the vehicle is traveling.

8. The vibration applying structure detecting device of claim 7,
wherein the rate at which the threshold value setting device reduces the vibration frequency threshold value and/or vibration amplitude threshold value of the wheels in the departure direction judged to have a lane departure tendency corresponding to both the type of road on which the vehicle is traveling and the departure direction of the lane departure tendency.

9. The vibration applying structure detecting device of claim 5,
wherein the lane departure judgment device detects a transverse velocity of the vehicle with respect to the direction of travel; and
wherein the threshold value setting device adjusts the second prescribed period of time based at least in part on the transverse velocity of the vehicle.

10. The vibration applying structure detecting device of claim 9,
wherein the threshold value setting device reduces the vibration frequency threshold value and/or vibration amplitude threshold value of the wheels on the side opposite the departure direction of the lane departure tendency to a prescribed small value at a prescribed reduced rate within the second prescribed period of time.

11. The vibration applying structure detecting device of claim 1,
wherein the lane departure tendency is judged based on the vehicle velocity and the image taken by the camera.

12. A vehicle control device comprising:
a vibration applying structure detecting device having a lane departure judgment device that determines whether there is a lane departure tendency;
a vibration detecting device that determines the frequency and amplitude of input vibration from a road surface to the vehicle;
a lane departure judgment device that determines whether there is a lane departure tendency based on camera image taken by a vehicle mounted camera
a contact judgment device that determines that the wheels of the vehicle are contacting a vibration applying structure located on or adjacent to the roadway on which the vehicle is traveling, when the input vibration with an amplitude equal to or greater than a prescribed vibration amplitude threshold value has a frequency that is equal to or greater than a prescribed vibration frequency threshold;
a yaw moment application device that applies a yaw moment to the vehicle to prevent the vehicle from departing from the roadway when it is determined that the wheels of the vehicle are contacting the vibration applying structure; and
a threshold value setting device that sets one or both of the vibration frequency threshold value and vibration amplitude threshold value to a value smaller when it is judged that there is a lane departure tendency than that when it is judged that there is no lane departure tendency, and
wherein the threshold value setting device returns the vibration frequency threshold value and/or vibration amplitude threshold value of the wheels in a departure direction judged to have a lane departure tendency to the vibration frequency threshold value and/or vibration amplitude threshold value before it was reduced after a first prescribed period of time has passed since the vibration frequency threshold value and/or vibration amplitude threshold value was reduced.

13. The vehicle control device of claim 12,
wherein when there is a lane departure tendency, the lane departure judgment device detects the departure direction of the lane departure;
wherein the vibration detecting device detects the input vibration to each of the wheels of the vehicle;
wherein the contact judgment device determines whether each of the wheels is contacting the vibration applying structure by determining whether the input vibration with an amplitude equal to or greater than the prescribed vibration amplitude threshold value has a frequency that is equal to or greater than the prescribed frequency with respect to each input vibration from each of the wheels; and
wherein the yaw moment applying device applies a yaw moment to the vehicle to prevent the vehicle from departing from the roadway when it is judged that the wheels in the departure direction of the vehicle are contacting the vibration applying structure.

14. The vehicle control device of claim 13, further comprising:
a deceleration device that applies deceleration to the vehicle when it is detected that the wheels opposite the departure direction are contacting the vibration applying structure within a prescribed period of time after it is detected that the wheels in the departure direction of the vehicle are contacting the vibration applying structure.

15. The vehicle control device of claim 13, the vibration applying structure further comprising a threshold value setting device that sets only the vibration frequency threshold value and/or the vibration amplitude threshold value corresponding to the wheels in the departure direction of the vehicle to a smaller value when it is judged that there is a lane departure tendency than that when it is judged that there is no lane departure tendency.

16. A vibration applying structure detecting device for a wheeled vehicle traveling on a roadway having a vibration applying structure on a road surface in or adjacent to the roadway, comprising:
- a lane departure judgment means for determining whether there is a lane departure tendency based on camera image taken by a vehicle mounted camera;
- a vibration detecting means for determining the frequency and amplitude of input vibration from a road surface to the vehicle;
- a contact judgment means for determining that at least one of the wheels of the vehicle is contacting the vibration applying structure when the input vibration with an amplitude equal to or greater than a prescribed vibration amplitude threshold value has a frequency that is equal to or greater than a prescribed vibration frequency threshold value; and
- a threshold value setting means used to set one or both of the vibration amplitude threshold value and the vibration frequency threshold value;
- wherein when it is judged by the lane departure tendency judgment that there is a lane departure tendency, the threshold value setting means sets the vibration frequency threshold value and/or the vibration amplitude threshold value to a value smaller than that when it is judged that there is no lane departure tendency, and
- wherein the threshold value setting means returns the vibration frequency threshold value and/or vibration amplitude threshold value of the wheels in a departure direction judged to have a lane departure tendency to the vibration frequency threshold value and/or vibration amplitude threshold value before it was reduced after a first prescribed period of time has passed since the vibration frequency threshold value and/or vibration amplitude threshold value was reduced.

17. A method for determining that a wheeled vehicle has the possibility of departing a travel lane of a roadway having a vibration applying structure on a road surface in or adjacent to the roadway, comprising:
- determining whether there is a lane departure tendency of the vehicle based on camera image taken by a vehicle mounted camera;
- determining the frequency and amplitude of input vibration from the road surface to the vehicle;
- determining that at least one of the wheels of the vehicle is contacting the vibration applying structure, when the input vibration with an amplitude equal to or greater than a prescribed vibration amplitude threshold value has a frequency that is equal to or greater than a prescribed vibration frequency threshold value;
- setting one or both of the vibration amplitude threshold value and the vibration frequency threshold value; and
- when it is judged by the lane departure tendency judgment that there is a lane departure tendency, setting the vibration frequency threshold value and/or the vibration amplitude threshold value to a value smaller than that when it is judged that there is no lane departure tendency, and
- setting the vibration frequency threshold value and/or vibration amplitude threshold value of the wheels in a departure direction judged to have a lane departure tendency to the vibration frequency threshold value and/or vibration amplitude threshold value before it was reduced after a first prescribed period of time has passed since the vibration frequency threshold value and/or vibration amplitude threshold value was reduced.

18. A vibration applying structure detecting device for a wheeled vehicle traveling on a roadway having a vibration applying structure on a road surface in or adjacent to the roadway, comprising:
- a lane departure judgment device that determines whether there is a lane departure tendency;
- a vibration detecting device that determines the frequency and the amplitude of input vibration from a road surface to the vehicle;
- a contact judgment device that determines that at least one of the wheels of the vehicle is contacting the vibration applying structure when the input vibration with an amplitude equal to or greater than a prescribed amplitude threshold value has a frequency that is equal to or greater than a prescribed frequency threshold value;
- a threshold value setting device that sets one or both of the amplitude threshold value and the frequency threshold value;
- wherein when it is judged by the lane departure tendency judgment device that there is a lane departure tendency, the threshold value setting device sets one or both of the frequency threshold value and the amplitude threshold value to a value smaller than that when it is judged that there is no lane departure tendency;
- wherein the lane departure judgment device determines whether there is the lane departure tendency and detects the departure direction of the lane departure;
- wherein the vibration detecting device detects the vibration input to each of the left and right wheels of the vehicle from the road surface as the vibration input to the vehicle;
- wherein the contact judgment device determines whether each of the left and right wheels is contacting the vibration applying structure by determining whether the frequency of the vibration with an amplitude equal to or greater than a prescribed amplitude threshold value is equal to or greater than a prescribed frequency with respect to each detected vibration input to each of the left and right wheels;
- wherein the threshold value setting device sets only the frequency threshold value and/or the amplitude threshold value corresponding to the wheels in the departure direction judged to have a lane departure tendency to a value smaller than that when it is judged that there is no lane departure tendency; and
- wherein the threshold value setting device returns the frequency threshold value and/or vibration amplitude threshold value of the wheels in the departure direction judged to have a lane departure tendency to the frequency threshold value and/or amplitude threshold value before it was reduced after a first prescribed period of time has passed since the frequency threshold value and/or amplitude threshold value was reduced.

19. A vibration applying structure detecting device for a wheeled vehicle traveling on a roadway having a vibration applying structure on a road surface in or adjacent to the roadway, comprising:
- a lane departure judgment device that determines whether there is a lane departure tendency;
- a vibration detecting device that determines the frequency and the amplitude of input vibration from a road surface to the vehicle;
- a contact judgment device that determines that at least one of the wheels of the vehicle is contacting the vibration applying structure when the input vibration with an amplitude equal to or greater than a prescribed amplitude threshold value has a frequency that is equal to or greater than a prescribed frequency threshold value;

a threshold value setting device that sets one or both of the amplitude threshold value and the frequency threshold value;

wherein when it is judged by the lane departure tendency judgment device that there is a lane departure tendency, the threshold value setting device sets one or both of the frequency threshold value and the amplitude threshold value to a value smaller than that when it is judged that there is no lane departure tendency, wherein the lane departure judgment device determines whether there is the lane departure tendency and detects the departure direction of the lane departure;

wherein the vibration detecting device detects the vibration input to each of the left and right wheels of the vehicle from the road surface as the vibration input to the vehicle;

wherein the contact judgment device determines whether each of the left and right wheels is contacting the vibration applying structure by determining whether the frequency of the vibration with an amplitude equal to or greater than a prescribed amplitude threshold value is equal to or greater than a prescribed frequency with respect to each detected vibration input to each of the left and right wheels;

wherein the threshold value setting device sets only the frequency threshold value and/or the amplitude threshold value corresponding to the wheels in the departure direction judged to have a lane departure tendency to a value smaller than that when it is judged that there is no lane departure tendency; and wherein the threshold value setting device reduces the frequency threshold value and/or vibration threshold value of the wheels in the departure direction judged to have a lane departure tendency at a rate corresponding to the type of road on which the vehicle is traveling.

20. The vibration applying structure detecting device of claim 18, wherein the threshold value setting device reduces the frequency threshold value and/or amplitude threshold value of the wheels on the opposite side of the departure direction judged to have a lane departure tendency after a second prescribed period of time from the time at which it is judged that the wheels on the side of the departure direction are contacting the vibration applying structure.

21. The vibration applying structure detecting device of claim 20, wherein the threshold value setting device returns the frequency threshold value and/or amplitude threshold value of the wheels on the opposite side of the departure direction judged to have a lane departure tendency to the frequency threshold value and/or amplitude threshold value after the second prescribed period of time from the time at which it was reduced after the first prescribed period of time.

22. The vibration applying structure detecting device of claim 19, wherein the rate at which the threshold value setting device reduces the vibration frequency threshold value and/or vibration amplitude threshold value of the wheels in the departure direction judged to have a lane departure tendency corresponding to both the type of road on which the vehicle is traveling and the departure direction of the lane departure tendency.

23. The vibration applying structure detecting device of claim 20, wherein the lane departure judgment device detects a transverse velocity of the vehicle with respect to the direction of travel; and wherein the threshold value setting device adjusts the second prescribed period of time based at least in part on the transverse velocity of the vehicle.

24. The vibration applying structure detecting device of claim 23, wherein the threshold value setting device reduces the frequency threshold value and/or amplitude threshold value of the wheels on the side opposite the departure direction of the lane departure tendency to a prescribed small value at a prescribed reduced rate within the second prescribed period of time.

\* \* \* \* \*